US012713501B2

(12) United States Patent
Kim et al.

(10) Patent No.: US 12,713,501 B2
(45) Date of Patent: Aug. 18, 2026

(54) METHOD AND DEVICE FOR GROUP-BASED SENSING IN WIRELESS LAN SYSTEM

(71) Applicant: LG ELECTRONICS INC., Seoul (KR)

(72) Inventors: Sang Gook Kim, San Diego, CA (US); Jinsoo Choi, Seoul (KR); Dongguk Lim, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 306 days.

(21) Appl. No.: 18/567,728

(22) PCT Filed: Jun. 3, 2022

(86) PCT No.: PCT/KR2022/007941
§ 371 (c)(1),
(2) Date: Dec. 6, 2023

(87) PCT Pub. No.: WO2022/260370
PCT Pub. Date: Dec. 15, 2022

(65) Prior Publication Data
US 2024/0373506 A1 Nov. 7, 2024

Related U.S. Application Data

(60) Provisional application No. 63/197,518, filed on Jun. 7, 2021.

(51) Int. Cl.
*H04W 76/40* (2018.01)
*H04W 72/51* (2023.01)
*H04W 84/12* (2009.01)

(52) U.S. Cl.
CPC .......... *H04W 76/40* (2018.02); *H04W 72/51* (2023.01); *H04W 84/12* (2013.01)

(58) Field of Classification Search
None
See application file for complete search history.

(56) References Cited

U.S. PATENT DOCUMENTS

2021/0288779 A1* 9/2021 Da Silva ............... H04L 5/0053
2023/0221428 A1* 7/2023 Jang ...................... H04W 76/11 342/42

FOREIGN PATENT DOCUMENTS

CN 101083658 A * 12/2007
CN 108551684 A * 9/2018 ............ H04W 48/16

(Continued)

OTHER PUBLICATIONS

Chen, et al., "Overview of Wi-Fi sensing protocol," IEEE 802.11-20/1851r3, Mar. 2021.*

(Continued)

*Primary Examiner* — Andrew C Oh
(74) *Attorney, Agent, or Firm* — LEE, HONG, DEGERMAN, KANG & WAIMEY

(57) ABSTRACT

Disclosed are a method and device for communicating in a wireless LAN system. A method for a first station (STA) to communicate in a wireless LAN system comprises the steps of: transmitting, to a plurality of STAs, a first frame for forming a group that is to perform a sensing operation; transmitting a second frame, including information related to a sensing session, to at least one STA that has transmitted a first response frame to the first frame among the plurality of STAs; performing a first sensing operation with the at least one STA in a first sensing burst in the sensing session; and performing a second sensing operation with the at least one STA in a second sensing burst, following the first sensing burst, in the sensing session.

13 Claims, 20 Drawing Sheets

(56) References Cited

FOREIGN PATENT DOCUMENTS

| | | | | | |
|---|---|---|---|---|---|
| CN | 112825568 | A | * | 5/2021 | ........... G01S 13/825 |
| EP | 3193555 | A1 | * | 7/2017 | ........ H04W 72/0453 |
| TW | 201328404 | A | * | 7/2013 | ............ H04W 72/21 |
| WO | WO-2018040046 | A1 | * | 3/2018 | ........... H04L 5/0053 |
| WO | 2020159197 | | | 8/2020 | |
| WO | WO-2021246807 | A1 | * | 12/2021 | ............... G01S 5/02 |
| WO | WO-2022057996 | A1 | * | 3/2022 | ........... H04L 1/0026 |

OTHER PUBLICATIONS

PCT International Application No. PCT/KR2022/007941, International Search Report dated Sep. 7, 2022, 3 pages.
Chen, et al., “Overview of Wi-Fi sensing protocol,” IEEE 802.11-20/1851r3, Mar. 2021, 12 pages.
Trainin, et al., “Sensing session and measurement exchange identification,” IEEE 802.11-21/0644r3, May 2021, 14 pages.
Aboul-Magd, et al., “A Proposed Sensing Procedure for 802.11bf,” IEEE 802.11-21/0854r0, May 2021, 8 pages.
Jang, et al., “Discussion on WLAN Sensing Procedure,” IEEE 802.11-20/1804r1, Mar. 2021, 13 pages.

* cited by examiner

METHOD AND DEVICE FOR GROUP-BASED SENSING IN WIRELESS LAN SYSTEM

CROSS-REFERENCE TO RELATED APPLICATION(S)

This application is the National Stage filing under 35 U.S.C. 371 of International Application No. PCT/KR2022/007941, filed on Jun. 3, 2022, which claims the benefit of earlier filing date and right of priority to U.S. Provisional Application No. 63/197,518, filed on Jun. 7, 2021, the contents of which are all incorporated by reference herein in their entirety.

TECHNICAL FIELD

The present disclosure relates to a sensing method and device in a wireless local area network (WLAN) system, and more specifically, to a method and device for group-based sensing in a next-generation wireless LAN system.

BACKGROUND

New technologies for improving transmission rates, increasing bandwidth, improving reliability, reducing errors, and reducing latency have been introduced for a wireless LAN (WLAN). Among WLAN technologies, an Institute of Electrical and Electronics Engineers (IEEE) 802.11 series standard may be referred to as Wi-Fi. For example, technologies recently introduced to WLAN include enhancements for Very High-Throughput (VHT) of the 802.11ac standard, and enhancements for High Efficiency (HE) of the IEEE 802.11ax standard.

Improvement technologies for providing sensing for devices using wireless LAN signals are being discussed. For example, in IEEE 802.11 task group (TG) bf, standard technology is being developed to perform sensing of objects (e.g., people, objects, etc.) based on channel estimation using wireless LAN signals between devices operating in the frequency band below 7 GHz. Object sensing based on wireless LAN signals has the advantage of utilizing existing frequency bands and has a lower possibility of privacy infringement compared to existing sensing technologies. As the frequency range used in wireless LAN technology increases, precise sensing information can be obtained, and technologies for reducing power consumption to efficiently support precise sensing procedures are also being researched.

SUMMARY

The technical object of the present disclosure is to provide a sensing method and device in a wireless LAN system.

An additional technical object of the present disclosure is to provide a method and device for forming a sensing group in a wireless LAN system and performing one or more sensing operations within the sensing group.

The technical objects to be achieved by the present disclosure are not limited to the above-described technical objects, and other technical objects which are not described herein will be clearly understood by those skilled in the pertinent art from the following description.

A method of performing communication by a first station (STA) in a wireless LAN system according to an aspect of the present disclosure may include: transmitting, to a plurality of STAs, a first frame to form a group to perform a sensing operation: transmitting, to at least one STA among the plurality of STAs that transmitted a first response frame for the first frame, a second frame including information related to a sensing session; performing a first sensing operation with the at least one STA in a first sensing burst of the sensing session; and performing a second sensing operation with the at least one STA in a second sensing burst following the first sensing burst during the sensing session, and the first sensing operation may include transmitting a sensing frame from the first STA to the at least one STA, and the second sensing operation may include transmitting the sensing frame from the second STA to the first STA and a remaining STA among the at least one STA.

A method of performing communication by a second station (STA) in a wireless LAN system according to an additional aspect of the present disclosure may include receiving, from the first STA, a first frame to form a group to perform a sensing operation; transmitting, to the first STA, a first response frame for the first frame: receiving, from the first STA, a second frame including information related to a sensing session: performing a first sensing operation with the first STA and another STA that transmitted the first response frame in a first sensing burst of the sensing session; and performing a second sensing operation with the first STA and another STA that transmitted the first response frame in a second sensing burst following the first sensing burst during the sensing session.

According to the present disclosure, a sensing method and device in a wireless LAN system may be provided.

According to the present disclosure, a method and device for forming a sensing group in a wireless LAN system and performing one or more sensing operations within the sensing group may be provided.

According to the present disclosure, more accurate sensing information may be obtained and power consumption may be reduced through group-based sensing in a wireless LAN system.

According to the present disclosure, a sensing operation may be performed in a more expanded bandwidth by focusing on measurement and feedback for the allocated bandwidth using the power given in the wireless LAN system.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
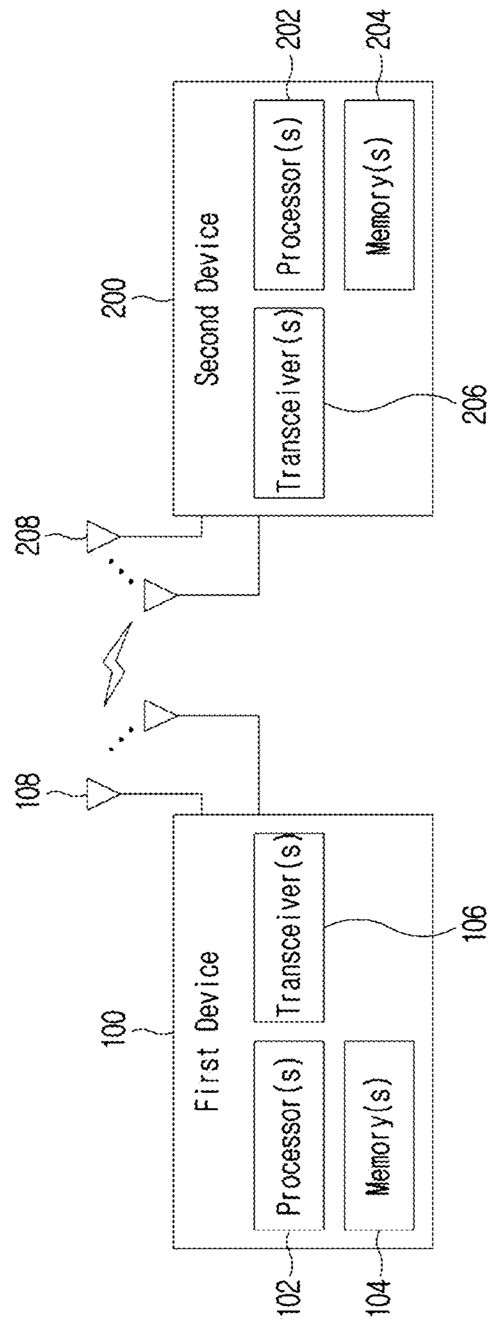
FIG. 1 illustrates a block configuration diagram of a wireless communication device according to an embodiment of the present disclosure.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

Examples of the present disclosure may be applied to various wireless communication systems. For example, examples of the present disclosure may be applied to a wireless LAN system. For example, examples of the present disclosure may be applied to an IEEE 802.11a/g/n/ac/ax standards-based wireless LAN. Furthermore, examples of the present disclosure may be applied to a wireless LAN based on the newly proposed IEEE 802.11be (or EHT) standard. Examples of the present disclosure may be applied to an IEEE 802.11be Release-2 standard-based wireless LAN corresponding to an additional enhancement technology of the IEEE 802.11be Release-1 standard. Additionally, examples of the present disclosure may be applied to a next-generation standards-based wireless LAN after IEEE 802.11be. Further, examples of this disclosure may be applied to a cellular wireless communication system. For example, it may be applied to a cellular wireless communication system based on Long Term Evolution (LTE)-based technology and 5G New Radio (NR)-based technology of the 3rd Generation Partnership Project (3GPP) standard.

Hereinafter, technical features to which examples of the present disclosure may be applied will be described.

FIG. 1 illustrates a block diagram of a wireless communication device according to an embodiment of the present disclosure.

The first device 100 and the second device 200 illustrated in FIG. 1 may be replaced with various terms such as a terminal, a wireless device, a Wireless Transmit Receive Unit (WTRU), an User Equipment (UE), a Mobile Station (MS), an user terminal (UT), a Mobile Subscriber Station (MSS), a Mobile Subscriber Unit (MSU), a subscriber station (SS), an advanced mobile station (AMS), a wireless terminal (WT), or simply user, etc. In addition, the first device 100 and the second device 200 include an access point (AP), a base station (BS), a fixed station, a Node B, a base transceiver system (BTS), a network, It may be replaced with various terms such as an Artificial Intelligence (AI) system, a road side unit (RSU), a repeater, a router, a relay, and a gateway.

The devices 100 and 200 illustrated in FIG. 1 may be referred to as stations (STAs). For example, the devices 100 and 200 illustrated in FIG. 1 may be referred to by various terms such as a transmitting device, a receiving device, a transmitting STA, and a receiving STA. For example, the STAs 110 and 200 may perform an access point (AP) role or a non-AP role. That is, in the present disclosure, the STAs 110 and 200 may perform functions of an AP and/or a non-AP. When the STAs 110 and 200 perform an AP function, they may be simply referred to as APs, and when the STAs 110 and 200 perform non-AP functions, they may be simply referred to as STAs. In addition, in the present disclosure, an AP may also be indicated as an AP STA.

Referring to FIG. 1, the first device 100 and the second device 200 may transmit and receive radio signals through various wireless LAN technologies (e.g., IEEE 802.11 series). The first device 100 and the second device 200 may include an interface for a medium access control (MAC) layer and a physical layer (PHY) conforming to the IEEE 802.11 standard.

In addition, the first device 100 and the second device 200 may additionally support various communication standards (e.g., 3GPP LTE series, 5G NR series standards, etc.) technologies other than wireless LAN technology. In addition, the device of the present disclosure may be implemented in various devices such as a mobile phone, a vehicle, a personal computer, augmented reality (AR) equipment, and virtual reality (VR) equipment, etc. In addition, the STA of the present specification may support various communication services such as a voice call, a video call, data communication, autonomous-driving, machine-type communication (MTC), machine-to-machine (M2M), device-to-device (D2D), IoT (Internet-of-Things), etc.

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including instructions for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless LAN technology (e.g., IEEE 802.11 series). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including instructions for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless LAN technology (e.g., IEEE 802.11 series). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC). One or more processors 102, 202 may generate one or more PDUs (Protocol Data Unit) and/or one or more SDUs (Service Data Unit) according to description, functions, procedures, proposals, methods and/or operation flow charts disclosed in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, an instruction and/or a set of instructions.

One or more memories 104, 204 may be connected to one or more processors 102, 202 and may store data, a signal, a message, information, a program, a code, an indication and/or an instruction in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

For example, one of the STAs 100 and 200 may perform an intended operation of an AP, and the other of the STAs 100 and 200 may perform an intended operation of a non-AP STA. For example, the transceivers 106 and 206 of FIG. 1 may perform a transmission and reception operation of a signal (e.g., a packet or a physical layer protocol data unit (PPDU) conforming to IEEE 802.11a/b/g/n/ac/ax/be). In addition, in the present disclosure, an operation in which various STAs generate transmission/reception signals or perform data processing or calculation in advance for transmission/reception signals may be performed by the processors 102 and 202 of FIG. 1. For example, an example of an operation of generating a transmission/reception signal or performing data processing or calculation in advance for the transmission/reception signal may include 1) determining/acquiring/configuring/calculating/decoding/encoding bit information of fields (signal (SIG), short training field (STF), long training field (LTF), Data, etc.) included in the PPDU, 2) determining/configuring/acquiring time resources or frequency resources (e.g., subcarrier resources) used for fields (SIG, STF, LTF, Data, etc.) included in the PPDU: 3) determining/configuring/acquiring a specific sequence (e.g., pilot sequence, STF/LTF sequence, extra sequence applied to SIG) used for fields (SIG, STF, LTF, Data, etc.) included in the PPDU action, 4) power control operation and/or power saving operation applied to the STA, 5) Operations related to ACK signal determination/acquisition/configuration/calculation/decoding/encoding, etc. In addition, in the following example, various information (e.g., information related to fields/subfields/control fields/parameters/power, etc.) used by various STAs to determine/acquire/configure/calculate/decode/encode transmission and reception signals may be stored in the memories 104 and 204 of FIG. 1.

Hereinafter, downlink (DL) may mean a link for communication from an AP STA to a non-AP STA, and a DL PPDU/packet/signal may be transmitted and received through the DL. In DL communication, a transmitter may be part of an AP STA, and a receiver may be part of a non-AP STA. Uplink (UL) may mean a link for communication from non-AP STAs to AP STAs, and a UL PPDU/packet/signal may be transmitted and received through the UL. In UL communication, a transmitter may be part of a non-AP STA, and a receiver may be part of an AP STA.

Figure 2:
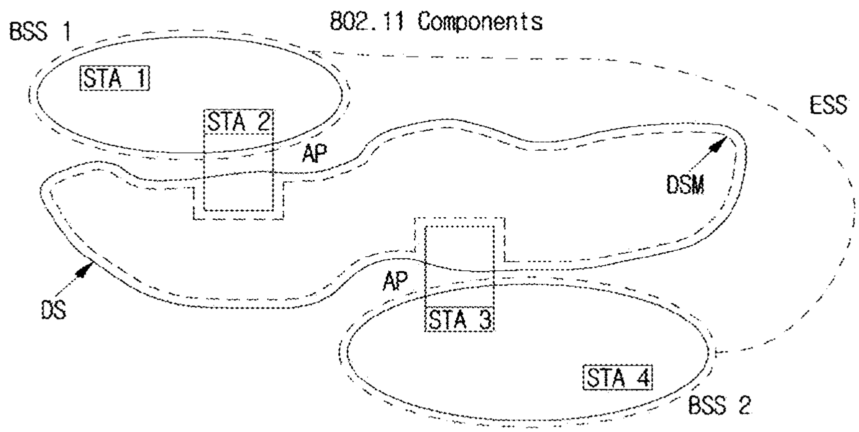
FIG. 2 is a diagram illustrating an exemplary structure of a WLAN system to which the present disclosure may be applied.

FIG. 2 is a diagram illustrating an exemplary structure of a wireless LAN system to which the present disclosure may be applied.

The structure of the wireless LAN system may consist of be composed of a plurality of components. A wireless LAN supporting STA mobility transparent to an upper layer may be provided by interaction of a plurality of components. A Basic Service Set (BSS) corresponds to a basic construction block of a wireless LAN. FIG. 2 exemplarily shows that two BSSs (BSS1 and BSS2) exist and two STAs are included as members of each BSS (STA1 and STA2 are included in BSS1, and STA3 and STA4 are included in BSS2). An ellipse representing a BSS in FIG. 2 may also be understood as representing a coverage area in which STAs included in the corresponding BSS maintain communication. This area may be referred to as a Basic Service Area (BSA). When an STA moves out of the BSA, it may not directly communicate with other STAs within the BSA.

If the DS shown in FIG. 2 is not considered, the most basic type of BSS in a wireless LAN is an independent BSS (IBSS). For example, IBSS may have a minimal form containing only two STAs. For example, assuming that other components are omitted, BSS1 containing only STA1 and STA2 or BSS2 containing only STA3 and STA4 may respectively correspond to representative examples of IBSS. This configuration is possible when STAs may communicate directly without an AP. In addition, in this type of wireless LAN, it is not configured in advance, but may be configured when a LAN is required, and this may be referred to as an ad-hoc network. Since the IBSS does not include an AP, there is no centralized management entity. That is, in IBSS, STAs are managed in a distributed manner. In IBSS, all STAs may be made up of mobile STAs, and access to the distributed system (DS) is not allowed, forming a self-contained network.

Membership of an STA in the BSS may be dynamically changed by turning on or off the STA, entering or exiting the BSS area, and the like. To become a member of the BSS, the STA may join the BSS using a synchronization process. In order to access all services of the BSS infrastructure, the STA shall be associated with the BSS. This association may be dynamically established and may include the use of a Distribution System Service (DSS).

A direct STA-to-STA distance in a wireless LAN may be limited by PHY performance. In some cases, this distance limit may be sufficient, but in some cases, communication between STAs at a longer distance may be required. A distributed system (DS) may be configured to support extended coverage.

DS means a structure in which BSSs are interconnected. Specifically, as shown in FIG. 2, a BSS may exist as an extended form of a network composed of a plurality of BSSs. DS is a logical concept and may be specified by the characteristics of Distributed System Media (DSM). In this regard, a wireless medium (WM) and a DSM may be logically separated. Each logical medium is used for a different purpose and is used by different components. These medium are not limited to being the same, nor are they limited to being different. In this way, the flexibility of the wireless LAN structure (DS structure or other network structure) may be explained in that a plurality of media are logically different. That is, the wireless LAN structure may be implemented in various ways, and the corresponding wireless LAN structure may be independently specified by the physical characteristics of each embodiment.

A DS may support a mobile device by providing seamless integration of a plurality of BSSs and providing logical services necessary to address an address to a destination. In addition, the DS may further include a component called a portal that serves as a bridge for connection between the wireless LAN and other networks (e.g., IEEE 802.X).

The AP enables access to the DS through the WM for the associated non-AP STAs, and means an entity that also has the functionality of an STA. Data movement between the BSS and the DS may be performed through the AP. For example, STA2 and STA3 shown in FIG. 2 have the functionality of STAs, and provide a function allowing the associated non-AP STAs (STA1 and STA4) to access the DS. In addition, since all APs basically correspond to STAs, all APs are addressable entities. The address used by the AP for communication on the WM and the address used by the AP for communication on the DSM are not necessarily the same. A BSS composed of an AP and one or more STAs may be referred to as an infrastructure BSS.

Data transmitted from one of the STA(s) associated with an AP to a STA address of the corresponding AP may be always received on an uncontrolled port and may be processed by an IEEE 802.1X port access entity. In addition, when a controlled port is authenticated, transmission data (or frames) may be delivered to the DS.

In addition to the structure of the DS described above, an extended service set (ESS) may be configured to provide wide coverage.

An ESS means a network in which a network having an arbitrary size and complexity is composed of DSs and BSSs. The ESS may correspond to a set of BSSs connected to one DS. However, the ESS does not include the DS. An ESS network is characterized by being seen as an IBSS in the Logical Link Control (LLC) layer. STAs included in the ESS may communicate with each other, and mobile STAs may move from one BSS to another BSS (within the same ESS) transparently to the LLC. APs included in one ESS may have the same service set identification (SSID). The SSID is distinguished from the BSSID, which is an identifier of the BSS.

The wireless LAN system does not assume anything about the relative physical locations of BSSs, and all of the following forms are possible. BSSs may partially overlap, which is a form commonly used to provide continuous coverage. In addition, BSSs may not be physically connected, and logically there is no limit on the distance between BSSs. In addition, the BSSs may be physically located in the same location, which may be used to provide redundancy. In addition, one (or more than one) IBSS or ESS networks may physically exist in the same space as one (or more than one) ESS network. When an ad-hoc network operates in a location where an ESS network exists, when physically overlapping wireless networks are configured by different organizations, or when two or more different access and security policies are required in the same location, this may correspond to the form of an ESS network in the like.

Figure 3:
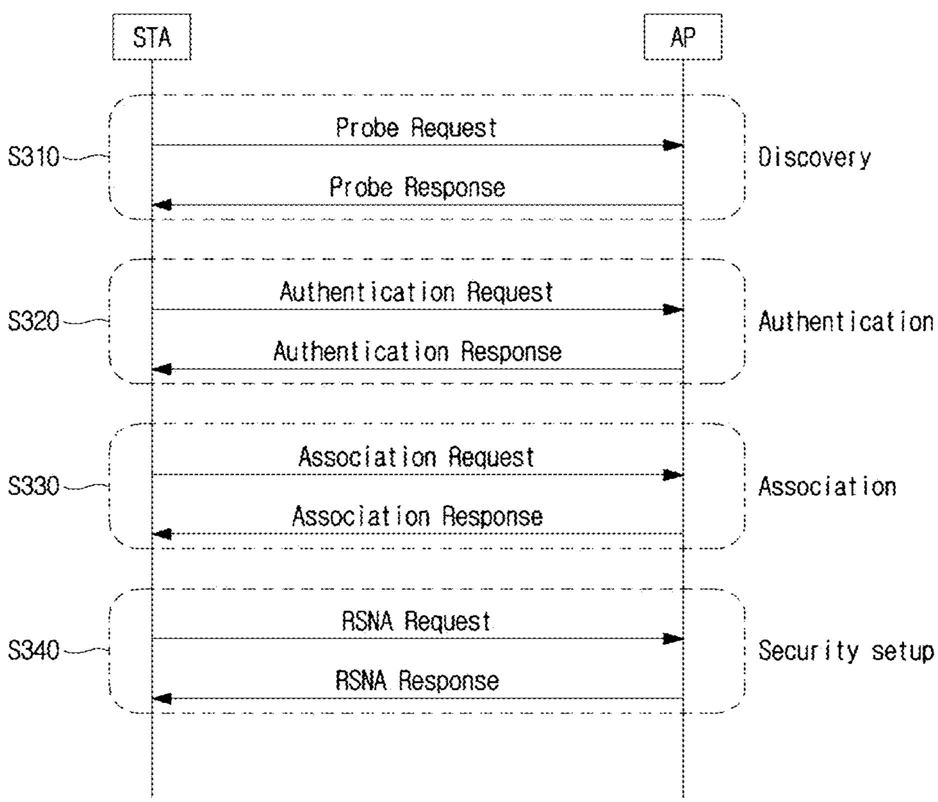
FIG. 3 is a diagram for describing a link setup process to which the present disclosure may be applied.

FIG. 3 is a diagram for explaining a link setup process to which the present disclosure may be applied.

In order for an STA to set up a link with respect to a network and transmit/receive data, it first discovers a network, performs authentication, establishes an association, and need to perform the authentication process for security. The link setup process may also be referred to as a session initiation process or a session setup process. In addition, the processes of discovery, authentication, association, and security setting of the link setup process may be collectively referred to as an association process.

In step S310, the STA may perform a network discovery operation. The network discovery operation may include a scanning operation of the STA. That is, in order for the STA to access the network, it needs to find a network in which it can participate. The STA shall identify a compatible network before participating in a wireless network, and the process of identifying a network existing in a specific area is called scanning.

Scanning schemes include active scanning and passive scanning. FIG. 3 exemplarily illustrates a network discovery operation including an active scanning process. In active scanning, an STA performing scanning transmits a probe request frame to discover which APs exist around it while moving channels and waits for a response thereto. A responder transmits a probe response frame as a response to the probe request frame to the STA that has transmitted the probe request frame. Here, the responder may be an STA that last transmitted a beacon frame in the BSS of the channel being scanned. In the BSS, since the AP transmits the beacon frame, the AP becomes a responder, and in the IBSS, the STAs in the IBSS rotate to transmit the beacon frame, so the responder is not constant. For example, a STA that transmits a probe request frame on channel 1 and receives a probe response frame on channel 1, may store BSS-related information included in the received probe response frame and may move to the next channel (e.g., channel 2) and perform scanning (i.e., transmission/reception of a probe request/response on channel 2) in the same manner.

Although not shown in FIG. 3, the scanning operation may be performed in a passive scanning manner. In passive scanning, a STA performing scanning waits for a beacon frame while moving channels. The beacon frame is one of the management frames defined in IEEE 802.11, and is periodically transmitted to notify the existence of a wireless network and to allow the STA performing scanning to find a wireless network and participate in the wireless network. In the BSS, the AP serves to transmit beacon frames periodically, and in the IBSS, STAs within the IBSS rotate to transmit beacon frames. When the STA performing scanning receives a beacon frame, the STA stores information for the BSS included in the beacon frame and records beacon frame information in each channel while moving to another channel. The STA receiving the beacon frame may store BSS-related information included in the received beacon frame, move to the next channel, and perform scanning in the next channel in the same way. Comparing active scanning and passive scanning, active scanning has an advantage of having less delay and less power consumption than passive scanning.

After the STA discovers the network, an authentication process may be performed in step S320. This authentication process may be referred to as a first authentication process in order to be clearly distinguished from the security setup operation of step S340 to be described later.

The authentication process includes a process in which the STA transmits an authentication request frame to the AP, and in response to this, the AP transmits an authentication response frame to the STA. An authentication frame used for authentication request/response corresponds to a management frame.

The authentication frame includes an authentication algorithm number, an authentication transaction sequence number, a status code, a challenge text, a robust security network (RSN), and a Finite Cyclic Group, etc. This corresponds to some examples of information that may be included in the authentication request/response frame, and may be replaced with other information or additional information may be further included.

The STA may transmit an authentication request frame to the AP. The AP may determine whether to allow authentication of the corresponding STA based on information included in the received authentication request frame. The AP may provide the result of the authentication process to the STA through an authentication response frame.

After the STA is successfully authenticated, an association process may be performed in step S330. The association process includes a process in which the STA transmits an association request frame to the AP, and in response, the AP transmits an association response frame to the STA.

For example, the association request frame may include information related to various capabilities, a beacon listen interval, a service set identifier (SSID), supported rates, supported channels, RSN, mobility domain, supported operating classes, Traffic Indication Map Broadcast request (TIM broadcast request), interworking service capability, etc. For example, the association response frame may include information related to various capabilities, status code, association ID (AID), supported rates, enhanced distributed channel access (EDCA) parameter set, received channel power indicator (RCPI), received signal to noise indicator (RSNI), mobility domain, timeout interval (e.g., association comeback time), overlapping BSS scan parameters, TIM broadcast response, Quality of Service (QOS) map, etc. This corresponds to some examples of information that may be included in the association request/response frame, and may be replaced with other information or additional information may be further included.

After the STA is successfully associated with the network, a security setup process may be performed in step S340. The security setup process of step S340 may be referred to as an authentication process through Robust Security Network Association (RSNA) request/response, and the authentication process of step S320 is referred to as a first authentication process, and the security setup process of step S340 may also simply be referred to as an authentication process.

The security setup process of step S340 may include, for example, a process of setting up a private key through 4-way handshaking through an Extensible Authentication Protocol over LAN (EAPOL) frame. In addition, the security setup process may be performed according to a security scheme not defined in the IEEE 802.11 standard.

Figure 4:
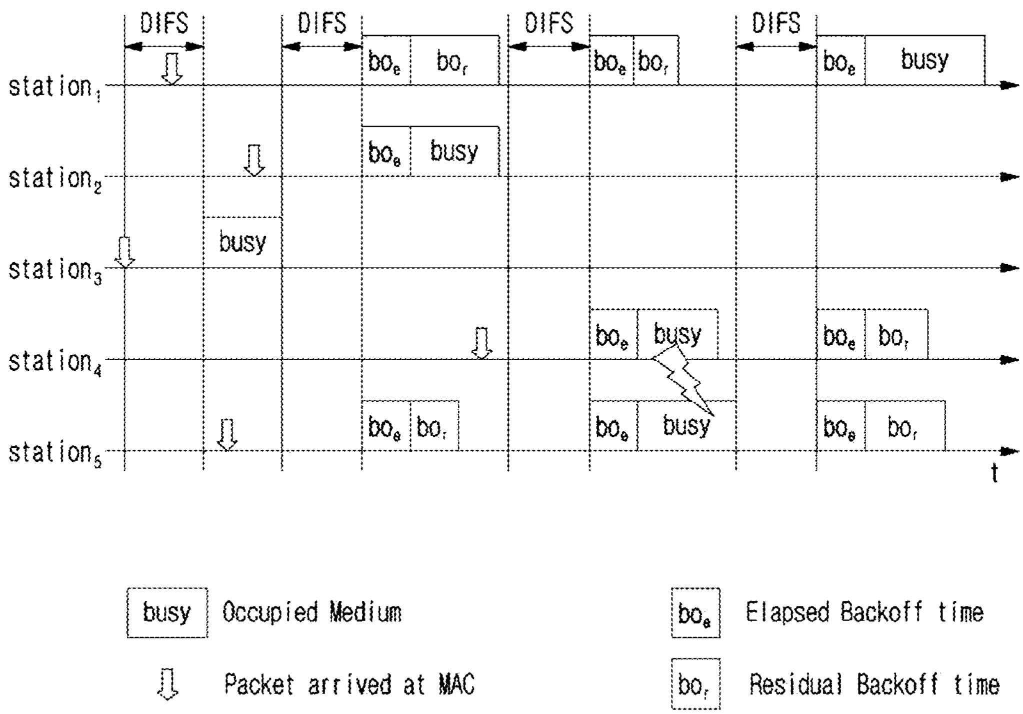
FIG. 4 is a diagram for describing a backoff process to which the present disclosure may be applied.

FIG. 4 is a diagram for explaining a backoff process to which the present disclosure may be applied.

In the wireless LAN system, a basic access mechanism of medium access control (MAC) is a carrier sense multiple access with collision avoidance (CSMA/CA) mechanism. The CSMA/CA mechanism is also called Distributed Coordination Function (DCF) of IEEE 802.11 MAC, and basically adopts a "listen before talk" access mechanism. According to this type of access mechanism, the AP and/or STA may perform Clear Channel Assessment (CCA) sensing a radio channel or medium during a predetermined time interval (e.g., DCF Inter-Frame Space (DIFS)), prior to starting transmission. As a result of the sensing, if it is determined that the medium is in an idle state, frame transmission is started through the corresponding medium. On the other hand, if it is detected that the medium is occupied or busy, the corresponding AP and/or STA does not start its own transmission and may set a delay period for medium access (e.g., a random backoff period) and attempt frame transmission after waiting. By applying the random backoff period, since it is expected that several STAs attempt frame transmission after waiting for different periods of time, collision may be minimized.

In addition, the IEEE 802.11 MAC protocol provides a Hybrid Coordination Function (HCF). HCF is based on the DCF and Point Coordination Function (PCF). PCF is a polling-based synchronous access method and refers to a method in which all receiving APs and/or STAs periodically poll to receive data frames. In addition, HCF has Enhanced Distributed Channel Access (EDCA) and HCF Controlled Channel Access (HCCA). EDCA is a contention-based access method for a provider to provide data frames to multiple users, and HCCA uses a non-contention-based channel access method using a polling mechanism. In addition, the HCF includes a medium access mechanism for improving QOS (Quality of Service) of the wireless LAN, and may transmit QoS data in both a Contention Period (CP) and a Contention Free Period (CFP).

Referring to FIG. 4, an operation based on a random backoff period will be described. When the occupied/busy medium changes to an idle state, several STAs may attempt to transmit data (or frames). As a method for minimizing collisions, each of STAs may respectively select a random backoff count and attempt transmission after waiting for a corresponding slot time. The random backoff count has a pseudo-random integer value and may be determined as one of values ranging from 0 to CW. Here, CW is a contention window parameter value. The CW parameter is given CWmin as an initial value, but may take a value twice as large in case of transmission failure (e.g., when an ACK for the transmitted frame is not received). When the CW parameter value reaches CWmax, data transmission may be attempted while maintaining the CWmax value until data transmission is successful, and when data transmission is successful, the CWmin value is reset. The values of CW, CWmin and CWmax are preferably set to 2n−1 (n=0, 1, 2, . . . ).

When the random backoff process starts, the STA continuously monitors the medium while counting down the backoff slots according to the determined backoff count value. When the medium is monitored for occupancy, it stops counting down and waits, and resumes the rest of the countdown when the medium becomes idle.

In the example of FIG. 4, when a packet to be transmitted arrives at the MAC of STA3, STA3 may transmit the frame immediately after confirming that the medium is idle as much as DIFS. The remaining STAs monitor and wait for the medium to be occupied/busy. In the meantime, data to be transmitted may also occur in each of STA1, STA2, and STA5, and each STA waits as long as DIFS when the medium is monitored as idle, and then may perform a countdown of the backoff slot according to the random backoff count value selected by each STA. Assume that STA2 selects the smallest backoff count value and STA1 selects the largest backoff count value. That is, the case where the remaining back-off time of STAs is shorter than the remaining back-off time of STA1 at the time when STA2 completes the back-off count and starts frame transmission is exemplified. STA1 and STA5 temporarily stop counting down and wait while STA2 occupies the medium. When the occupation of STA2 ends and the medium becomes idle again, STA1 and STA5 wait for DIFS and resume the stopped backoff count. That is, frame transmission may be started after counting down the remaining backoff slots for the remaining backoff time. Since the remaining backoff time of STAs is shorter than that of STA1, STAs starts frame transmission. While STA2 occupies the medium, data to be transmitted may also occur in STA4. From the standpoint of STA4, when the medium becomes idle, STA4 may wait for DIFS, and then may perform a countdown according to the random backoff count value selected by the STA4 and start transmitting frames. The example of FIG. 4 shows a case where the remaining backoff time of STA5 coincides with the random backoff count value of STA4 by chance. In this case, a collision may occur between STA4 and STA5. When a collision occurs, both STA4 and STA5 do not receive an ACK, so data transmission fails. In this case, STA4 and STA5 may double the CW value, select a random backoff count value, and perform a countdown. STA1 waits while the medium is occupied due to transmission of STA4 and STA5, waits for DIFS when the medium becomes idle, and then starts frame transmission after the remaining backoff time has elapsed.

As in the example of FIG. 4, the data frame is a frame used for transmission of data forwarded to a higher layer, and may be transmitted after a backoff performed after DIFS elapses from when the medium becomes idle. Additionally, the management frame is a frame used for exchange of management information that is not forwarded to a higher layer, and is transmitted after a backoff performed after an IFS such as DIFS or Point Coordination Function IFS (PIFS). As a subtype frames of management frame, there are a Beacon, an association request/response, a re-association request/response, a probe request/response, an authentication request/response, etc. A control frame is a frame used to control access to a medium. As a subtype frames of control frame, there are Request-To-Send (RTS), Clear-To-Send (CTS), Acknowledgement (ACK), Power Save-Poll (PS-Poll), block ACK (BlockAck), block ACK request (Block-ACKReq), null data packet announcement (NDP announcement), and trigger, etc. If the control frame is not a response frame of the previous frame, it is transmitted after backoff performed after DIFS elapses, and if it is a response frame of the previous frame, it is transmitted without performing backoff after short IFS (SIFS) elapses. The type and subtype of the frame may be identified by a type field and a subtype field in a frame control (FC) field.

A Quality of Service (QOS) STA may perform the backoff that is performed after an arbitration IFS (AIFS) for an access category (AC) to which the frame belongs, that is, AIFS[i] (where i is a value determined by AC), and then may transmit the frame. Here, the frame in which AIFS[i] can be used may be a data frame, a management frame, or a control frame other than a response frame.

Figure 5:
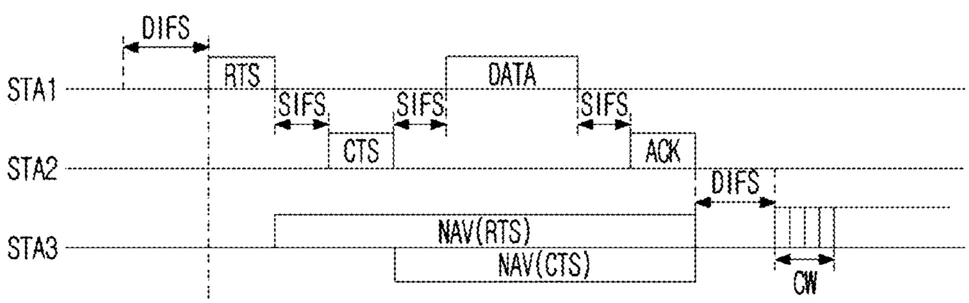
FIG. 5 is a diagram for describing a frame transmission operation based on CSMA/CA to which the present disclosure may be applied.

FIG. 5 is a diagram for explaining a frame transmission operation based on CSMA/CA to which the present disclosure may be applied.

As described above, the CSMA/CA mechanism includes virtual carrier sensing in addition to physical carrier sensing in which a STA directly senses a medium. Virtual carrier sensing is intended to compensate for problems that may occur in medium access, such as a hidden node problem. For virtual carrier sensing, the MAC of the STA may use a Network Allocation Vector (NAV). The NAV is a value indicating, to other STAs, the remaining time until the medium is available for use by an STA currently using or having the right to use the medium. Therefore, the value set as NAV corresponds to a period in which the medium is scheduled to be used by the STA transmitting the frame, and the STA receiving the NAV value is prohibited from accessing the medium during the corresponding period. For example, the NAV may be configured based on the value of the "duration" field of the MAC header of the frame.

In the example of FIG. 5, it is assumed that a STA1 intends to transmit data to a STA2, and a STA3 is in a position capable of overhearing some or all of frames transmitted and received between the STA1 and the STA2.

In order to reduce the possibility of collision of transmissions of multiple STAs in CSMA/CA based frame transmission operation, a mechanism using RTS/CTS frames may be applied. In the example of FIG. 5, while transmission of the STA1 is being performed, as a result of carrier sensing of the STA3, it may be determined that the medium is in an idle state. That is, the STA1 may correspond to a hidden node to the STA3. Alternatively, in the example of FIG. 5, it may be determined that the carrier sensing result medium of the STA3 is in an idle state while transmission of the STA2 is being performed. That is, the STA2 may correspond to a hidden node to the STA3. Through the exchange of RTS/CTS frames before performing data transmission and reception between the STA1 and the STA2, a STA outside the transmission range of one of the STA1 or the STA2, or a STA outside the carrier sensing range for transmission from the STA1 or the STA3 may not attempt to occupy the channel during data transmission and reception between the STA1 and the STA2.

Specifically, the STA1 may determine whether a channel is being used through carrier sensing. In terms of physical carrier sensing, the STA1 may determine a channel occupation idle state based on an energy level or signal correlation detected in a channel. In addition, in terms of virtual carrier sensing, the STA1 may determine a channel occupancy state using a network allocation vector (NAV) timer.

The STA1 may transmit an RTS frame to the STA2 after performing a backoff when the channel is in an idle state during DIFS. When the STA2 receives the RTS frame, the STA2 may transmit a CTS frame as a response to the RTS frame to the STA1 after SIFS.

If the STA3 cannot overhear the CTS frame from the STA2 but can overhear the RTS frame from the STA1, the STA3 may set a NAV timer for a frame transmission period (e.g., SIFS+CTS frame+SIFS+data frame+SIFS+ACK frame) that is continuously transmitted thereafter, using the duration information included in the RTS frame. Alternatively, if the STA3 can overhear a CTS frame from the STA2 although the STA3 cannot overhear an RTS frame from the STA1, the STA3 may set a NAV timer for a frame transmission period (e.g., SIFS+data frame+SIFS+ACK frame) that is continuously transmitted thereafter, using the duration information included in the CTS frame. That is, if the STA3 can overhear one or more of the RTS or CTS frames from one or more of the STA1 or the STA2, the STA3 may set the NAV accordingly. When the STA3 receives a new frame before the NAV timer expires, the STA3 may update the NAV timer using duration information included in the new frame. The STA3 does not attempt channel access until the NAV timer expires.

When the STA1 receives the CTS frame from the STA2, the STA1 may transmit the data frame to the STA2 after SIFS from the time point when the reception of the CTS frame is completed. When the STA2 successfully receives the data frame, the STA2 may transmit an ACK frame as a response to the data frame to the STA1 after SIFS. The STA3 may determine whether the channel is being used through carrier sensing when the NAV timer expires. When the STA3 determines that the channel is not used by other terminals during DIFS after expiration of the NAV timer, the STA3 may attempt channel access after a contention window (CW) according to a random backoff has passed.

Figure 6:
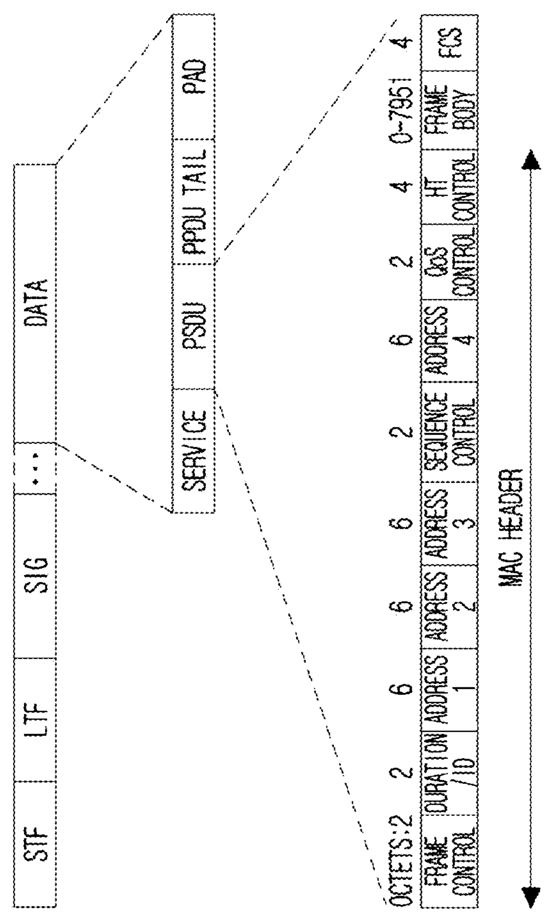
FIG. 6 is a diagram for describing an example of a frame structure used in a WLAN system to which the present disclosure may be applied.

FIG. 6 is a diagram for explaining an example of a frame structure used in a WLAN system to which the present disclosure may be applied.

By means of an instruction or primitive (meaning a set of instructions or parameters) from the MAC layer, the PHY layer may prepare a MAC PDU (MPDU) to be transmitted. For example, when a command requesting transmission start of the PHY layer is received from the MAC layer, the PHY layer switches to the transmission mode and configures information (e.g., data) provided from the MAC layer in the form of a frame and transmits it. In addition, when the PHY layer detects a valid preamble of the received frame, the PHY layer monitors the header of the preamble and sends a command notifying the start of reception of the PHY layer to the MAC layer.

In this way, information transmission/reception in a wireless LAN system is performed in the form of a frame, and for this purpose, a PHY layer protocol data unit (PPDU) frame format is defined.

A basic PPDU frame may include a Short Training Field (STF), a Long Training Field (LTF), a SIGNAL (SIG) field, and a Data field. The most basic (e.g., non-High Throughput (HT)) PPDU frame format may consist of only L-STF (Legacy-STF), L-LTF (Legacy-LTF), SIG field, and data field. In addition, depending on the type of PPDU frame format (e.g., HT-mixed format PPDU, HT-greenfield format PPDU, VHT (Very High Throughput) PPDU, etc.), an additional (or different type) STF, LTF, and SIG fields may be included between the SIG field and the data field (this will be described later with reference to FIG. 7).

The STF is a signal for signal detection, automatic gain control (AGC), diversity selection, precise time synchronization, and the like, and the LTF is a signal for channel estimation and frequency error estimation. The STF and LTF may be referred to as signals for synchronization and channel estimation of the OFDM physical layer.

The SIG field may include a RATE field and a LENGTH field. The RATE field may include information on modulation and coding rates of data. The LENGTH field may include information on the length of data. Additionally, the SIG field may include a parity bit, a SIG TAIL bit, and the like.

The data field may include a SERVICE field, a physical layer service data unit (PSDU), and a PPDU TAIL bit, and may also include padding bits if necessary. Some bits of the SERVICE field may be used for synchronization of the descrambler at the receiving end. The PSDU corresponds to the MAC PDU defined in the MAC layer, and may include data generated/used in the upper layer. The PPDU TAIL bit may be used to return the encoder to a 0 state. Padding bits may be used to adjust the length of a data field in a predetermined unit.

A MAC PDU is defined according to various MAC frame formats, and a basic MAC frame consists of a MAC header, a frame body, and a Frame Check Sequence (FCS). The MAC frame may consist of MAC PDUs and be transmitted/received through the PSDU of the data part of the PPDU frame format.

The MAC header includes a Frame Control field, a Duration/ID field, an Address field, and the like. The frame control field may include control information required for frame transmission/reception. The duration/ID field may be set to a time for transmitting a corresponding frame or the like. For details of the Sequence Control, QoS Control, and HT Control subfields of the MAC header, refer to the IEEE 802.11 standard document.

A null-data packet (NDP) frame format means a frame format that does not include a data packet. That is, the NDP frame refers to a frame format that includes a physical layer convergence procedure (PLCP) header part (i.e., STF, LTF, and SIG fields) in a general PPDU frame format and does not include the remaining parts (i.e., data field). A NDP frame may also be referred to as a short frame format.

Figure 7:
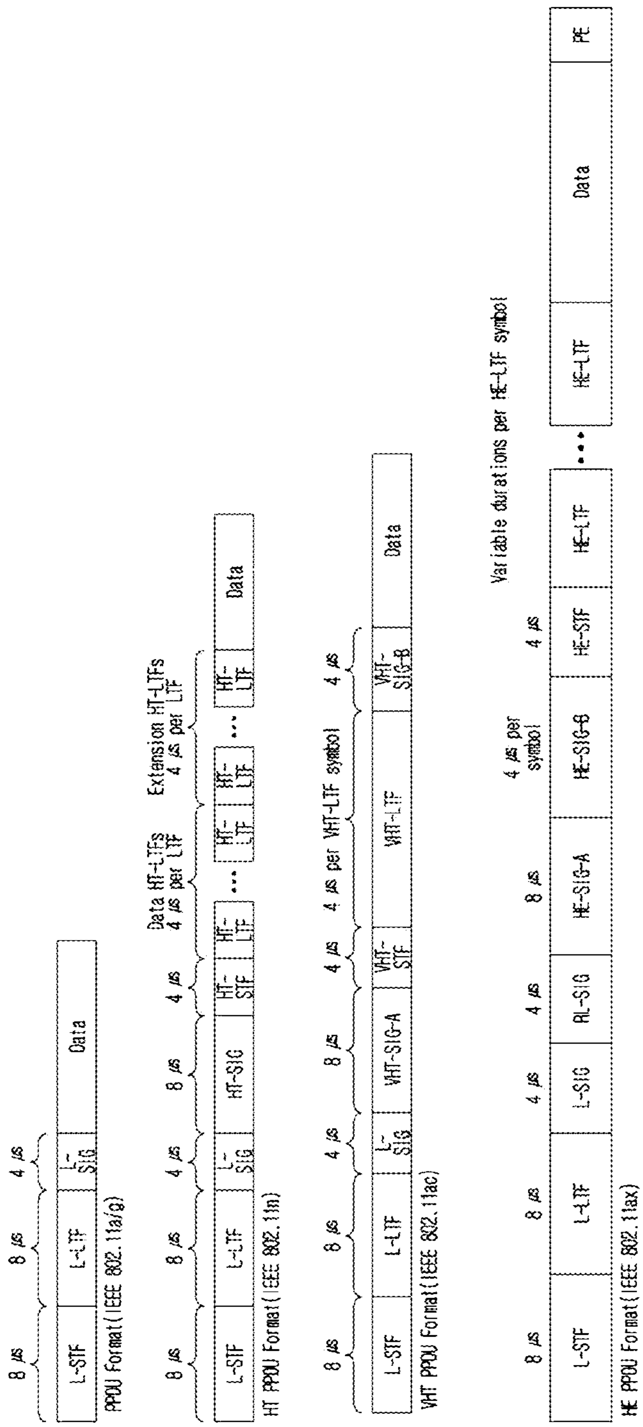
FIG. 7 is a diagram illustrating examples of PPDUs defined in the IEEE 802.11 standard to which the present disclosure may be applied.

FIG. 7 is a diagram illustrating examples of PPDUs defined in the IEEE 802.11 standard to which the present disclosure may be applied.

In standards such as IEEE 802.11a/g/n/ac/ax, various types of PPDUs have been used. The basic PPDU format (IEEE 802.11a/g) includes L-LTF, L-STF, L-SIG and Data fields. The basic PPDU format may also be referred to as a non-HT PPDU format.

The HT PPDU format (IEEE 802.11n) additionally includes HT-SIG, HT-STF, and HT-LFT(s) fields to the basic PPDU format. The HT PPDU format shown in FIG. 7 may be referred to as an HT-mixed format. In addition, an HT-greenfield format PPDU may be defined, and this corresponds to a format consisting of HT-GF-STF, HT-LTF1, HT-SIG, one or more HT-LTF, and Data field, not including L-STF, L-LTF, and L-SIG (not shown).

An example of the VHT PPDU format (IEEE 802.11ac) additionally includes VHT SIG-A, VHT-STF, VHT-LTF, and VHT-SIG-B fields to the basic PPDU format.

An example of the HE PPDU format (IEEE 802.11ax) additionally includes Repeated L-SIG (RL-SIG), HE-SIG-A, HE-SIG-B, HE-STF, HE-LTF(s), Packet Extension (PE)

field to the basic PPDU format. Some fields may be excluded or their length may vary according to detailed examples of the HE PPDU format. For example, the HE-SIG-B field is included in the HE PPDU format for multi-user (MU), and the HE-SIG-B is not included in the HE PPDU format for single user (SU). In addition, the HE trigger-based (TB) PPDU format does not include the HE-SIG-B, and the length of the HE-STF field may vary to 8 us. The Extended Range (HE ER) SU PPDU format does not include the HE-SIG-B field, and the length of the HE-SIG-A field may vary to 16 us.

Figure 8:
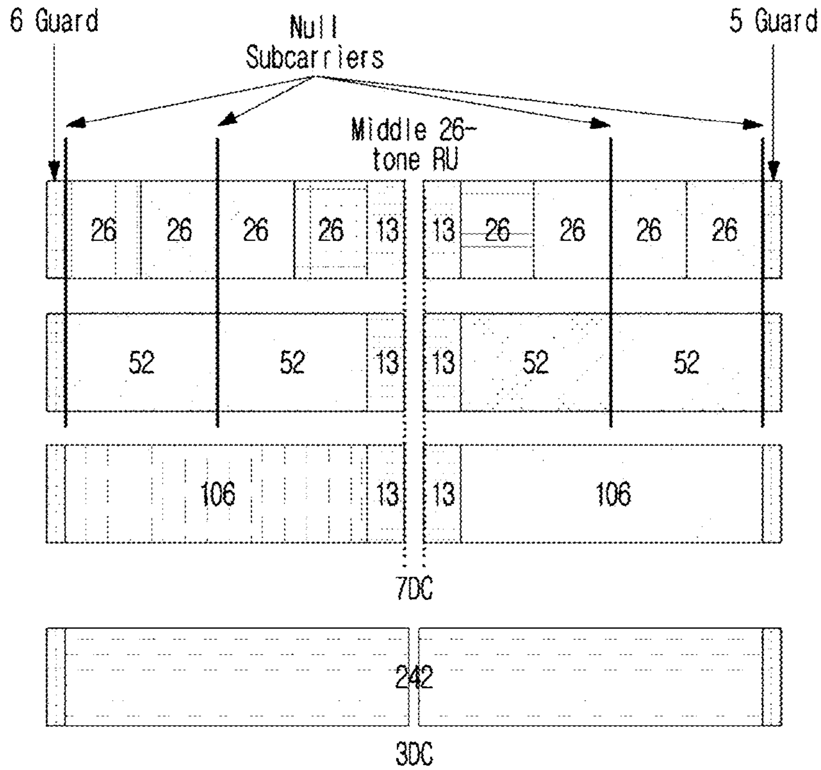
FIGS. 8 to 10 are diagrams for describing examples of resource units of a WLAN system to which the present disclosure may be applied.
Figure 9:
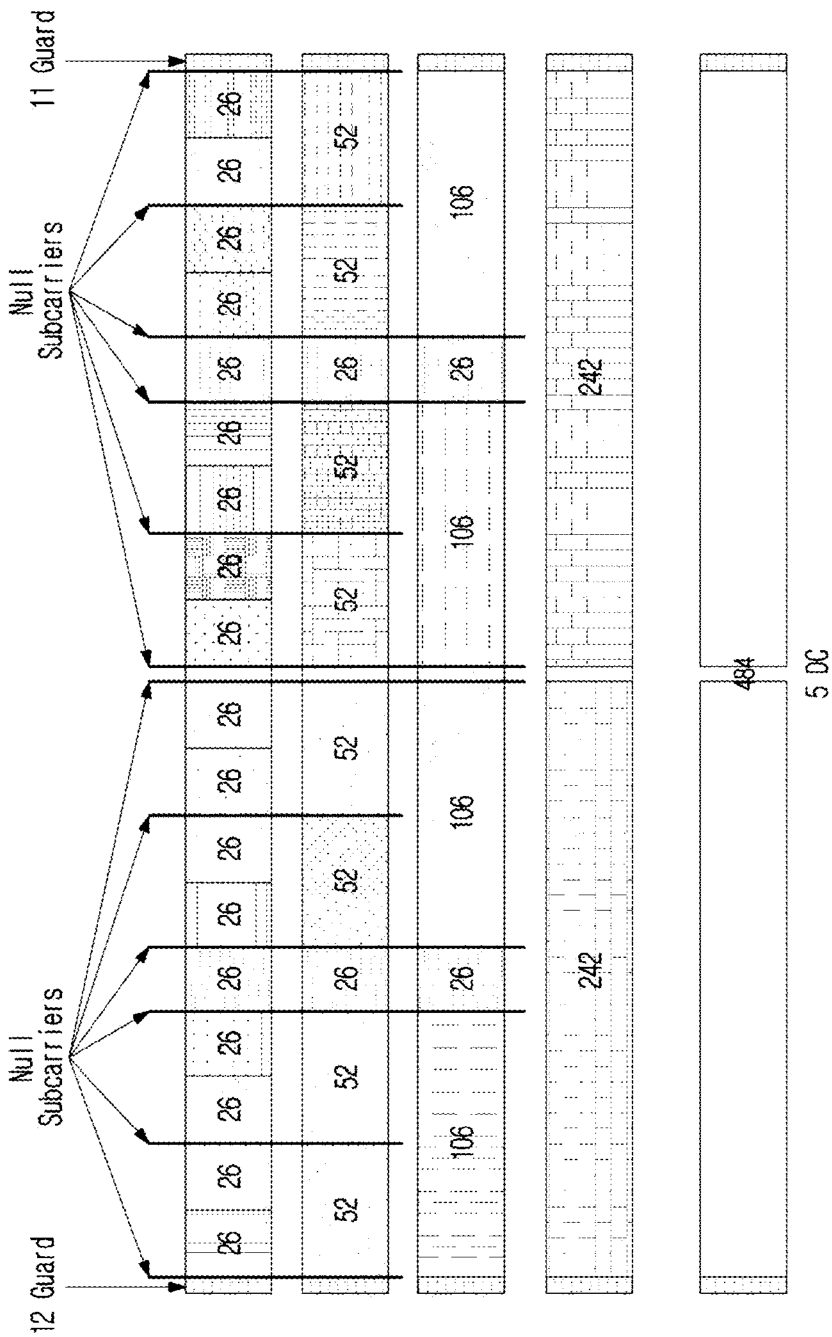
Figure 10:
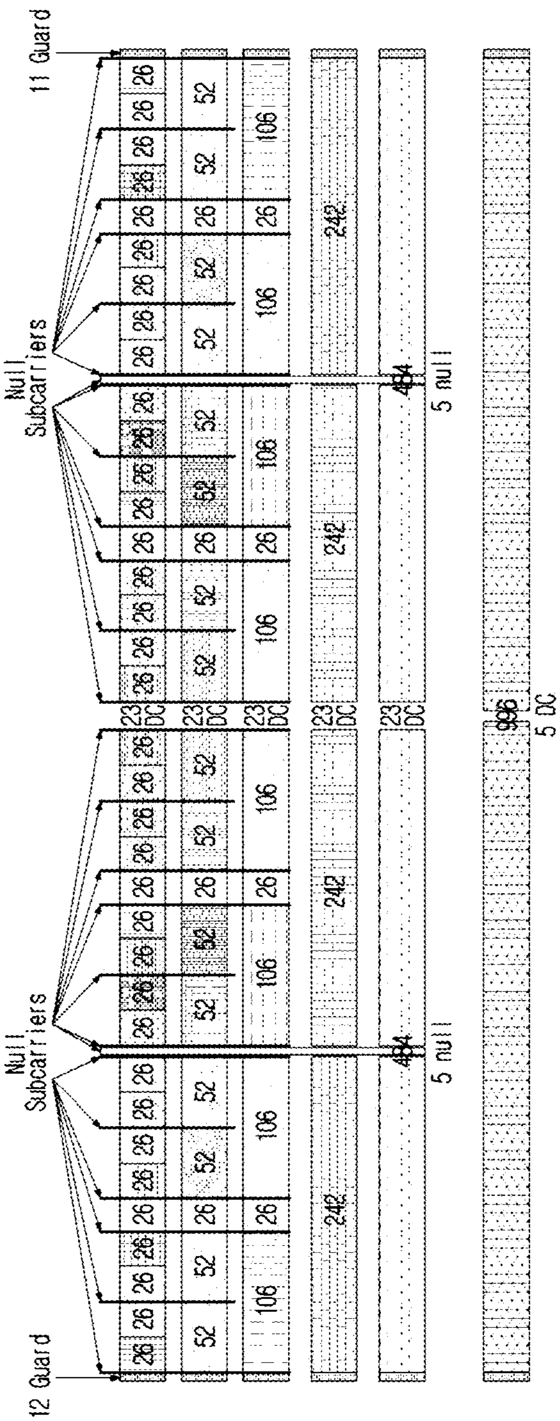

FIGS. 8 to 10 are diagrams for explaining examples of resource units of a WLAN system to which the present disclosure may be applied.

Referring to FIGS. 8 to 10, a resource unit (RU) defined in a wireless LAN system will be described. the RU may include a plurality of subcarriers (or tones). The RU may be used when transmitting signals to multiple STAs based on the OFDMA scheme. In addition, the RU may be defined even when a signal is transmitted to one STA. The RU may be used for STF, LTF, data field of the PPDU, etc.

As shown in FIGS. 8 to 10, RUs corresponding to different numbers of tones (i.e., subcarriers) are used to construct some fields of 20 MHz, 40 MHz, or 80 MHz X-PPDUs (X is HE, EHT, etc.). For example, resources may be allocated in RU units shown for the X-STF, X-LTF, and Data field.

FIG. 8 is a diagram illustrating an exemplary allocation of resource units (RUs) used on a 20 MHz band.

As shown at the top of FIG. 8, 26-units (i.e., units corresponding to 26 tones) may be allocated. 6 tones may be used as a guard band in the leftmost band of the 20 MHz band, and 5 tones may be used as a guard band in the rightmost band of the 20 MHz band. In addition, 7 DC tones are inserted in the center band, that is, the DC band, and 26-units corresponding to each of the 13 tones may exist on the left and right sides of the DC band. In addition, 26-unit, 52-unit, and 106-unit may be allocated to other bands. Each unit may be allocated for STAs or users.

The RU allocation of FIG. 8 is utilized not only in a situation for multiple users (MU) but also in a situation for a single user (SU), and in this case, it is possible to use one 242-unit as shown at the bottom of FIG. 8. In this case, three DC tones may be inserted.

In the example of FIG. 8, RUs of various sizes, that is, 26-RU, 52-RU, 106-RU, 242-RU, etc. are exemplified, but the specific size of these RUs may be reduced or expanded. Therefore, in the present disclosure, the specific size of each RU (i.e., the number of corresponding tones) is exemplary and not restrictive. In addition, within a predetermined bandwidth (e.g., 20, 40, 80, 160, 320 MHZ, . . . ) in the present disclosure, the number of RUs may vary according to the size of the RU. In the examples of FIG. 9 and/or FIG. 10 to be described below, the fact that the size and/or number of RUs may be varied is the same as the example of FIG. 8.

FIG. 9 is a diagram illustrating an exemplary allocation of resource units (RUs) used on a 40 MHz band.

Just as RUs of various sizes are used in the example of FIG. 8, 26-RU, 52-RU, 106-RU, 242-RU, 484-RU, and the like may be used in the example of FIG. 9 as well. In addition, 5 DC tones may be inserted at the center frequency, 12 tones may be used as a guard band in the leftmost band of the 40 MHz band, and 11 tones may be used as a guard band in the rightmost band of the 40 MHz band.

In addition, as shown, when used for a single user, a 484-RU may be used.

FIG. 10 is a diagram illustrating an exemplary allocation of resource units (RUs) used on an 80 MHz band.

Just as RUs of various sizes are used in the example of FIG. 8 and FIG. 9, 26-RU, 52-RU, 106-RU, 242-RU, 484-RU, 996-RU and the like may be used in the example of FIG. 10 as well. In addition, in the case of an 80 MHz PPDU, RU allocation of HE PPDUs and EHT PPDUs may be different, and the example of FIG. 10 shows an example of RU allocation for 80 MHZ EHT PPDUs. The scheme that 12 tones are used as a guard band in the leftmost band of the 80 MHz band and 11 tones are used as a guard band in the rightmost band of the 80 MHz band in the example of FIG. 10 is the same in HE PPDU and EHT PPDU. Unlike HE PPDU, where 7 DC tones are inserted in the DC band and there is one 26-RU corresponding to each of the 13 tones on the left and right sides of the DC band, in the EHT PPDU, 23 DC tones are inserted into the DC band, and one 26-RU exists on the left and right sides of the DC band. Unlike the HE PPDU, where one null subcarrier exists between 242-RUs rather than the center band, there are five null subcarriers in the EHT PPDU. In the HE PPDU, one 484-RU does not include null subcarriers, but in the EHT PPDU, one 484-RU includes 5 null subcarriers.

In addition, as shown, when used for a single user, 996-RU may be used, and in this case, 5 DC tones are inserted in common with HE PPDU and EHT PPDU.

EHT PPDUs over 160 MHz may be configured with a plurality of 80 MHz subblocks in FIG. 10. The RU allocation for each 80 MHz subblock may be the same as that of the 80 MHz EHT PPDU of FIG. 10. If the 80 MHz subblock of the 160 MHz or 320 MHZ EHT PPDU is not punctured and the entire 80 MHz subblock is used as part of RU or multiple RU (MRU), the 80 MHz subblock may use 996-RU of FIG. 10.

Here, the MRU corresponds to a group of subcarriers (or tones) composed of a plurality of RUs, and the plurality of RUs constituting the MRU may be RUs having the same size or RUs having different sizes. For example, a single MRU may be defined as 52+26-tone, 106+26-tone, 484+242-tone, 996+484-tone, 996+484+242-tone, 2X996+484-tone, 3X996-tone, or 3X996+484-tone. Here, the plurality of RUs constituting one MRU may correspond to small size (e.g., 26, 52, or 106) RUs or large size (e.g., 242, 484, or 996) RUs. That is, one MRU including a small size RU and a large size RU may not be configured/defined. In addition, a plurality of RUs constituting one MRU may or may not be consecutive in the frequency domain.

When an 80 MHz subblock includes RUs smaller than 996 tones, or parts of the 80 MHz subblock are punctured, the 80 MHz subblock may use RU allocation other than the 996-tone RU.

The RU of the present disclosure may be used for uplink (UL) and/or downlink (DL) communication. For example, when trigger-based UL-MU communication is performed, the STA transmitting the trigger (e.g., AP) may allocate a first RU (e.g., 26/52/106/242-RU, etc.) to a first STA and allocate a second RU (e.g., 26/52/106/242-RU, etc.) to a second STA, through trigger information (e.g., trigger frame or triggered response scheduling (TRS)). Thereafter, the first STA may transmit a first trigger-based (TB) PPDU based on the first RU, and the second STA may transmit a second TB PPDU based on the second RU. The first/second TB PPDUs may be transmitted to the AP in the same time period.

For example, when a DL MU PPDU is configured, the STA transmitting the DL MU PPDU (e.g., AP) may allocate a first RU (e.g., 26/52/106/242-RU, etc.) to a first STA and allocate a second RU (e.g., 26/52/106/242-RU, etc.) to a second STA. That is, the transmitting STA (e.g., AP) may transmit the HE-STF, HE-LTF, and Data fields for the first STA through the first RU within one MU PPDU, and may transmit the HE-STF, HE-LTF, and Data fields for the second STA through the second RU.

Information on the allocation of RUs may be signaled through HE-SIG-B in the HE PPDU format.

Figure 11:
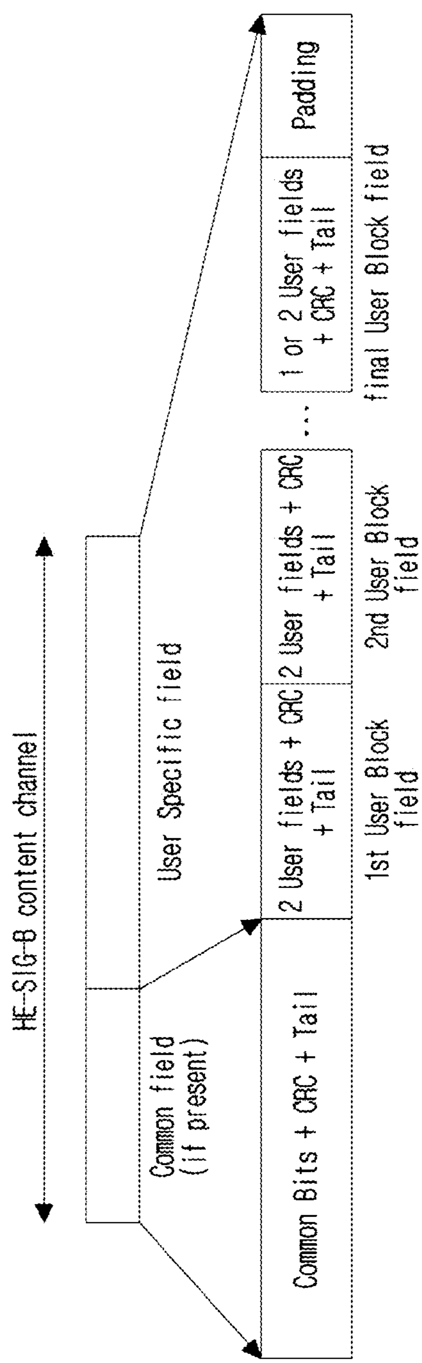
FIG. 11 illustrates an example structure of a HE-SIG-B field.

FIG. 11 illustrates an example structure of a HE-SIG-B field.

As shown, the HE-SIG-B field may include a common field and a user-specific field. If HE-SIG-B compression is applied (e.g., full-bandwidth MU-MIMO transmission), the common field may not be included in HE-SIG-B, and the HE-SIG-B content channel may include only a user-specific field. If HE-SIG-B compression is not applied, the common field may be included in HE-SIG-B.

The common field may include information on RU allocation (e.g., RU assignment, RUs allocated for MU-MIMO, the number of MU-MIMO users (STAs), etc.)

The common field may include N*8 RU allocation subfields. Here, N is the number of subfields, N=1 in the case of 20 or 40 MHz MU PPDU, N=2 in the case of 80 MHz MU PPDU, N=4 in the case of 160 MHz or 80+80 MHz MU PPDU, etc. One 8-bit RU allocation subfield may indicate the size (26, 52, 106, etc.) and frequency location (or RU index) of RUs included in the 20 MHz band.

For example, if a value of the 8-bit RU allocation subfield is 00000000, it may indicate that nine 26-RUs are sequentially allocated in order from the leftmost to the rightmost in the example of FIG. 8, if the value is 00000001, it may indicate that seven 26-RUs and one 52-RU are sequentially allocated in order from leftmost to rightest, and if the value is 00000010, it may indicate that five 26-RUs, one 52-RU, and two 26-RUs are sequentially allocated from the leftmost side to the rightmost side.

As an additional example, if the value of the 8-bit RU allocation subfield is 01000y2y1y0, it may indicate that one 106-RU and five 26-RUs are sequentially allocated from the leftmost to the rightmost in the example of FIG. 8. In this case, multiple users/STAs may be allocated to the 106-RU in the MU-MIMO scheme. Specifically, up to 8 users/STAs may be allocated to the 106-RU, and the number of users/STAs allocated to the 106-RU is determined based on 3-bit information (i.e., y2y1y0). For example, when the 3-bit information (y2y1y0) corresponds to a decimal value N, the number of users/STAs allocated to the 106-RU may be N+1.

Basically, one user/STA may be allocated to each of a plurality of RUs, and different users/STAs may be allocated to different RUs. For RUs larger than a predetermined size (e.g., 106, 242, 484, 996-tones, . . . ), a plurality of users/STAs may be allocated to one RU, and MU-MIMO scheme may be applied for the plurality of users/STAs.

The set of user-specific fields includes information on how all users (STAs) of the corresponding PPDU decode their payloads. User-specific fields may contain zero or more user block fields. The non-final user block field includes two user fields (i.e., information to be used for decoding in two STAs). The final user block field contains one or two user fields. The number of user fields may be indicated by the RU allocation subfield of HE-SIG-B, the number of symbols of HE-SIG-B, or the MU-MIMO user field of HE-SIG-A. A User-specific field may be encoded separately from or independently of a common field.

Figure 12:
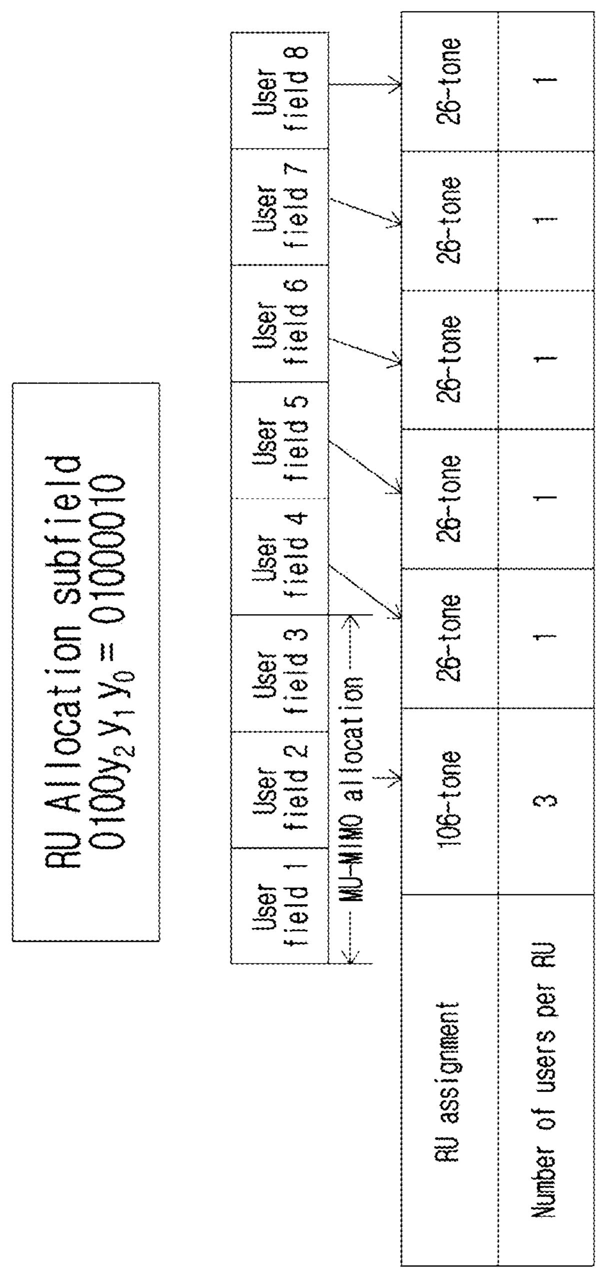
FIG. 12 is a diagram for describing a MU-MIMO method in which a plurality of users/STAs are allocated to one RU.

FIG. 12 is a diagram for explaining a MU-MIMO method in which a plurality of users/STAs are allocated to one RU.

In the example of FIG. 12, it is assumed that the value of the RU allocation subfield is 01000010. This corresponds to the case where y2y1y0=010 in 01000y2y1y0. 010 corresponds to 2 in decimal (i.e., N=2) and may indicate that 3 (=N+1) users are allocated to one RU. In this case, one 106-RU and five 26-RUs may be sequentially allocated from the leftmost side to the rightmost side of a specific 20 MHz band/channel. Three users/STAs may be allocated to the 106-RU in a MU-MIMO manner. As a result, a total of 8 users/STAs are allocated to the 20 MHz band/channel, and the user-specific field of HE-SIG-B may include 8 user fields (i.e., 4 user block fields). Eight user fields may be assigned to RUs as shown in FIG. 12.

The user field may be constructed based on two formats. The user field for a MU-MIMO allocation may be constructed with a first format, and the user field for non-MU-MIMO allocation may be constructed with a second format. Referring to the example of FIG. 12, user fields 1 to 3 may be based on the first format, and user fields 4 to 8 may be based on the second format. The first format and the second format may contain bit information of the same length (e.g., 21 bits).

The user field of the first format (i.e., format for MU-MIMO allocation) may be constructed as follows. For example, out of all 21 bits of one user field, B0-B10 includes the user's identification information (e.g., STA-ID, AID, partial AID, etc.), B11-14 includes spatial configuration information such as the number of spatial streams for the corresponding user, B15-B18 includes Modulation and Coding Scheme (MCS) information applied to the Data field of the corresponding PPDU, B19 is defined as a reserved field, and B20 may include information on a coding type (e.g., binary convolutional coding (BCC) or low-density parity check (LDPC)) applied to the Data field of the corresponding PPDU.

The user field of the second format (i.e., the format for non-MU-MIMO allocation) may be constructed as follows. For example, out of all 21 bits of one user field, B0-B10 includes the user's identification information (e.g., STA-ID, AID, partial AID, etc.), B11-13 includes information on the number of spatial streams (NSTS) applied to the corresponding RU, B14 includes information indicating whether beamforming is performed (or whether a beamforming steering matrix is applied), B15-B18 includes Modulation and Coding Scheme (MCS) information applied to the Data field of the corresponding PPDU, B19 includes information indicating whether DCM (dual carrier modulation) is applied, and B20 may include information on a coding type (e.g., BCC or LDPC) applied to the Data field of the corresponding PPDU.

MCS, MCS information, MCS index, MCS field, and the like used in the present disclosure may be indicated by a specific index value. For example, MCS information may be indicated as index 0 to index 11. MCS information includes information on constellation modulation type (e.g., BPSK, QPSK, 16-QAM, 64-QAM, 256-QAM, 1024-QAM, etc.), and coding rate (e.g., ½, ⅔, ¾, ⅚, etc.). Information on a channel coding type (e.g., BCC or LDPC) may be excluded from the MCS information.

Figure 13:
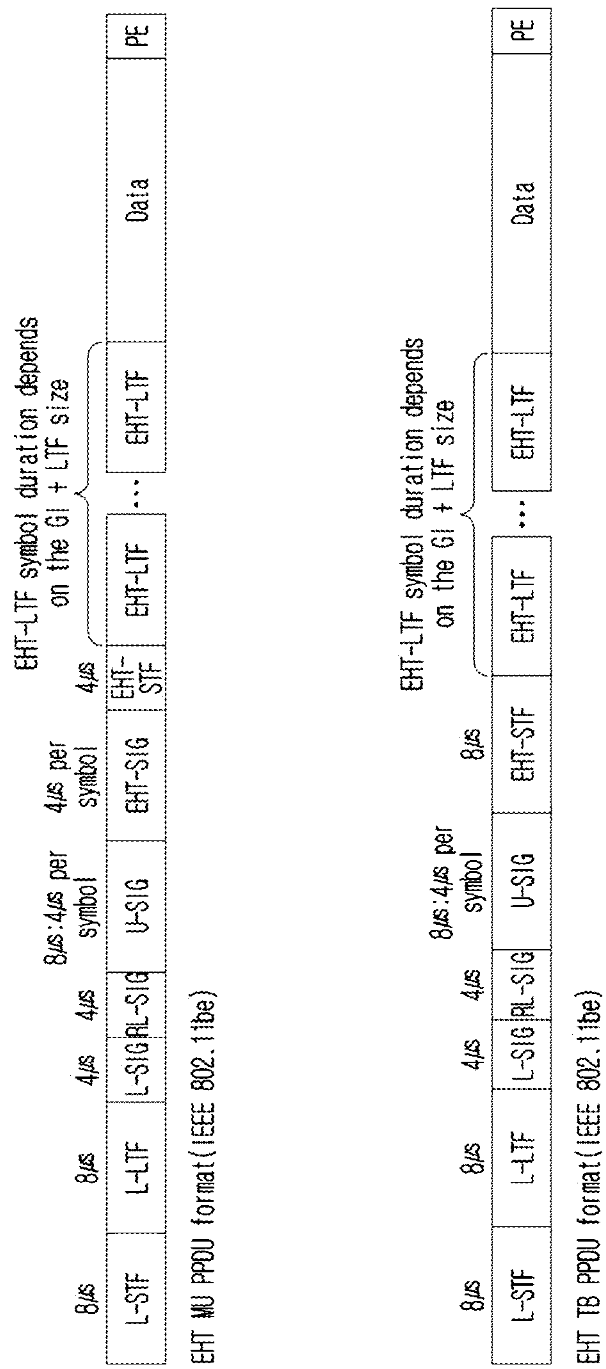
FIG. 13 illustrates an example of a PPDU format to which the present disclosure may be applied.

FIG. 13 illustrates an example of a PPDU format to which the present disclosure may be applied.

The PPDU of FIG. 13 may be referred as various names such as an EHT PPDU, a transmitted PPDU, a received PPDU, a first type or an Nth type PPDU. For example, the PPDU or EHT PPDU of the present disclosure may be referred as various names such as a transmission PPDU, a reception PPDU, a first type or an Nth type PPDU. In addition, the EHT PPU may be used in an EHT system and/or a new wireless LAN system in which the EHT system is improved.

The EHT MU PPDU of FIG. 13 corresponds to a PPDU carrying one or more data (or PSDUs) for one or more users. That is, the EHT MU PPDU may be used for both SU transmission and MU transmission. For example, the EHT MU PPDU may correspond to a PPDU for one receiving STA or a plurality of receiving STAs.

In the EHT TB PPDU of FIG. 13, the EHT-SIG is omitted compared to the EHT MU PPDU. Upon receiving a trigger for UL MU transmission (e.g., a trigger frame or TRS), the STA may perform UL transmission based on the EHT TB PPDU format.

In the example of the EHT PPDU format of FIG. 13, L-STF to EHT-LTF correspond to a preamble or a physical preamble, and may be generated/transmitted/received/acquired/decoded in the physical layer.

A Subcarrier frequency spacing of L-STF, L-LTF, L-SIG, RL-SIG, Universal SIGNAL (U-SIG), EHT-SIG field (these are referred to as pre-EHT modulated fields) may be set to 312.5 kHz. A subcarrier frequency spacing of the EHT-STF, EHT-LTF, Data, and PE field (these are referred to as EHT modulated fields) may be set to 78.125 KHz. That is, the tone/subcarrier index of L-STF, L-LTF, L-SIG, RL-SIG, U-SIG, and EHT-SIG field may be indicated in units of 312.5 kHz, and the tone/subcarrier index of EHT-STF, EHT-LTF, Data, and PE field may be indicated in units of 78.125 KHz.

The L-LTF and L-STF of FIG. 13 may be constructed identically to the corresponding fields of the PPDU described in FIGS. 6 to 7.

The L-SIG field of FIG. 13 may be constructed with 24 bits and may be used to communicate rate and length information. For example, the L-SIG field includes a 4-bit Rate field, a 1-bit Reserved bit, a 12-bit Length field, a 1-bit Parity field, and a 6-bit Tail field may be included. For example, the 12-bit Length field may include information on a time duration or a length of the PPDU. For example, a value of the 12-bit Length field may be determined based on the type of PPDU. For example, for a non-HT, HT, VHT, or EHT PPDU, the value of the Length field may be determined as a multiple of 3. For example, for the HE PPDU, the value of the Length field may be determined as a multiple of 3+1 or a multiple of 3+2.

For example, the transmitting STA may apply BCC encoding based on a coding rate of ½ to 24-bit information of the L-SIG field. Thereafter, the transmitting STA may obtain 48-bit BCC coded bits. BPSK modulation may be applied to 48-bit coded bits to generate 48 BPSK symbols. The transmitting STA may map 48 BPSK symbols to any location except for a pilot subcarrier (e.g., {subcarrier index −21, −7, +7, +21}) and a DC subcarrier (e.g., {subcarrier index 0}). As a result, 48 BPSK symbols may be mapped to subcarrier indices −26 to −22, −20 to −8, −6 to −1, +1 to +6, +8 to +20, and +22 to +26. The transmitting STA may additionally map the signals of {−1, −1, −1, 1} to the subcarrier index {−28, −27, +27, +28}. The above signal may be used for channel estimation in the frequency domain corresponding to {−28, −27, +27, +28}.

The transmitting STA may construct RL-SIG which is constructed identically to L-SIG. For RL-SIG, BPSK modulation is applied. The receiving STA may recognize that the received PPDU is a HE PPDU or an EHT PPDU based on the existence of the RL-SIG.

After the RL-SIG of FIG. 13, a Universal SIG (U-SIG) may be inserted. The U-SIG may be referred as various names such as a first SIG field, a first SIG, a first type SIG, a control signal, a control signal field, and a first (type) control signal, etc.

The U-SIG may include N-bit information and may include information for identifying the type of EHT PPDU. For example, U-SIG may be configured based on two symbols (e.g., two consecutive OFDM symbols). Each symbol (e.g., OFDM symbol) for the U-SIG may have a duration of 4 us, and the U-SIG may have a total 8 us duration. Each symbol of the U-SIG may be used to transmit 26 bit information. For example, each symbol of the U-SIG may be transmitted and received based on 52 data tones and 4 pilot tones.

Through the U-SIG (or U-SIG field), for example, A bit information (e.g., 52 un-coded bits) may be transmitted, the first symbol of the U-SIG (e.g., U-SIG-1) may transmit the first X bit information (e.g., 26 un-coded bits) of the total A bit information, and the second symbol of the U-SIG (e.g., U-SIG-2) may transmit the remaining Y-bit information (e.g., 26 un-coded bits) of the total A-bit information. For example, the transmitting STA may obtain 26 un-coded bits included in each U-SIG symbol. The transmitting STA may generate 52-coded bits by performing convolutional encoding (e.g., BCC encoding) based on a rate of R=½, and perform interleaving on the 52-coded bits. The transmitting STA may generate 52 BPSK symbols allocated to each U-SIG symbol by performing BPSK modulation on the interleaved 52-coded bits. One U-SIG symbol may be transmitted based on 56 tones (subcarriers) from subcarrier index −28 to subcarrier index +28, except for DC index 0. The 52 BPSK symbols generated by the transmitting STA may be transmitted based on the remaining tones (subcarriers) excluding pilot tones −21, −7, +7, and +21 tones.

For example, the A bit information (e.g., 52 un-coded bits) transmitted by the U-SIG includes a CRC field (e.g., a 4-bit field) and a tail field (e.g., 6 bit-length field). The CRC field and the tail field may be transmitted through the second symbol of the U-SIG. The CRC field may be constructed based on 26 bits allocated to the first symbol of U-SIG and 16 bits remaining except for the CRC/tail field in the second symbol, and may be constructed based on a conventional CRC calculation algorithm. In addition, the tail field may be used to terminate the trellis of the convolution decoder, and for example, the tail field may be set to 0.

A bit information (e.g., 52 un-coded bits) transmitted by the U-SIG (or U-SIG field) may be divided into version-independent bits and version-independent bits. For example, a size of the version-independent bits may be fixed or variable. For example, the version-independent bits may be allocated only to the first symbol of U-SIG, or the version-independent bits may be allocated to both the first symbol and the second symbol of U-SIG. For example, the version-independent bits and the version-dependent bits may be referred as various names such as a first control bit and a second control bit, etc.

For example, the version-independent bits of the U-SIG may include a 3-bit physical layer version identifier (PHY version identifier). For example, the 3-bit PHY version identifier may include information related to the PHY version of the transmitted/received PPDU. For example, the first value of the 3-bit PHY version identifier may indicate that the transmission/reception PPDU is an EHT PPDU. In other words, when transmitting the EHT PPDU, the transmitting STA may set the 3-bit PHY version identifier to a first value. In other words, the receiving STA may determine that the received PPDU is an EHT PPDU based on the PHY version identifier having the first value.

For example, the version-independent bits of U-SIG may include a 1-bit UL/DL flag field. A first value of the 1-bit UL/DL flag field is related to UL communication, and a second value of the UL/DL flag field is related to DL communication.

For example, the version-independent bits of the U-SIG may include information on the length of a transmission opportunity (TXOP) and information on a BSS color ID.

For example, if the EHT PPDU is classified into various types (e.g., EHT PPDU related to SU mode, EHT PPDU related to MU mode, EHT PPDU related to TB mode, EHT PPDU related to Extended Range transmission, etc.), information on the type of EHT PPDU may be included in the version-dependent bits of the U-SIG.

For example, the U-SIG may include information on 1) a bandwidth field containing information on a bandwidth, 2) a field containing information on a MCS scheme applied to EHT-SIG, 3) an indication field containing information related to whether the DCM technique is applied to the EHT-SIG, 4) a field containing information on the number of symbols used for EHT-SIG, 5) a field containing information on whether EHT-SIG is constructed over all bands, 6) a field containing information on the type of EHT-LTF/STF, and 7) a field indicating the length of EHT-LTF and CP length.

Preamble puncturing may be applied to the PPDU of FIG. 13. Preamble puncturing may mean transmission of a PPDU for which no signal is present in one or more 20 MHz subchannels among the bandwidth of the PPDU. Preamble puncturing may be applied to a PPDU transmitted to one or more users. For example, the resolution of preamble puncturing may be 20 MHz for EHT MU PPDUs in OFDMA transmissions with bandwidths greater than 40 MHz and non-OFDMA transmissions with 80 MHz and 160 MHz bandwidths. That is, in the above case, puncturing on a subchannel smaller than 242-tone RU may not be allowed. In addition, for an EHT MU PPDU in non-OFDMA transmission with a bandwidth of 320 MHZ, the resolution of preamble puncturing may be 40 MHz. That is, puncturing for a subchannel smaller than 484-tone RU in a 320 MHz bandwidth may not be allowed. In addition, preamble puncturing may not be applied to the primary 20 MHz channel in the EHT MU PPDU.

For example, for an EHT MU PPDU, information on preamble puncturing may be included in the U-SIG and/or the EHT-SIG. For example, the first field of the U-SIG may include information on the contiguous bandwidth of the PPDU, and the second field of the U-SIG may include information on preamble puncturing applied to the PPDU.

For example, the U-SIG and the EHT-SIG may include information on preamble puncturing based on the following method. If the bandwidth of the PPDU exceeds 80 MHZ, the U-SIG may be individually constructed in units of 80 MHz. For example, if the bandwidth of the PPDU is 160 MHZ, the PPDU may include a first U-SIG for a first 80 MHz band and a second U-SIG for a second 80 MHz band. In this case, the first field of the first U-SIG includes information on the 160 MHz bandwidth, and the second field of the first U-SIG includes information on preamble puncturing applied to the first 80 MHz band (i.e., information on a preamble puncturing pattern). In addition, the first field of the second U-SIG includes information on a 160 MHz bandwidth, and the second field of the second U-SIG includes information on preamble puncturing applied to a second 80 MHz band (i.e., information on a preamble puncturing pattern). The EHT-SIG following the first U-SIG may include information on preamble puncturing applied to the second 80 MHz band (i.e., information on a preamble puncturing pattern), and the EHT-SIG following the second U-SIG may include information on preamble puncturing applied to the first 80 MHz band (i.e., information on a preamble puncturing pattern).

Additionally or alternatively, the U-SIG and the EHT-SIG may include information on preamble puncturing based on the following method. The U-SIG may include information on preamble puncturing for all bands (i.e., information on a preamble puncturing pattern). That is, EHT-SIG does not include information on preamble puncturing, and only U-SIG may include information on preamble puncturing (i.e., information on a preamble puncturing pattern).

U-SIG may be constructed in units of 20 MHz. For example, if an 80 MHz PPDU is constructed, the U-SIG may be duplicated. That is, the same 4 U-SIGs may be included in the 80 MHz PPDU. PPDUs exceeding 80 MHz bandwidth may include different U-SIGs.

The EHT-SIG of FIG. 13 may include control information for the receiving STA. EHT-SIG may be transmitted through at least one symbol, and one symbol may have a length of 4 us. Information on the number of symbols used for EHT-SIG may be included in U-SIG.

The EHT-SIG may include technical features of HE-SIG-B described through FIGS. 11 and 12. For example, EHT-SIG, like the example of FIG. 8, may include a common field and a user-specific field. The Common field of the EHT-SIG may be omitted, and the number of user-specific fields may be determined based on the number of users.

As in the example of FIG. 11, the common field of the EHT-SIG and the user-specific field of the EHT-SIG may be coded separately. One user block field included in the user-specific field may contain information for two user fields, but the last user block field included in the user-specific field may contain one or two user fields. That is, one user block field of the EHT-SIG may contain up to two user fields. As in the example of FIG. 12, each user field may be related to MU-MIMO allocation or non-MU-MIMO allocation.

In the same way as in the example of FIG. 11, the common field of the EHT-SIG may include a CRC bit and a Tail bit, The length of the CRC bit may be determined as 4 bits, and the length of the tail bit is determined by 6 bits and may be set to 000000.

As in the example of FIG. 11, the common field of the EHT-SIG may include RU allocation information. RU allocation information may mean information on the location of an RU to which a plurality of users (i.e., a plurality of receiving STAs) are allocated. RU allocation information may be configured in units of 9 bits (or N bits).

A mode in which a common field of EHT-SIG is omitted may be supported. The mode in which the common field of the EHT-SIG is omitted may be referred as a compressed mode. When the compressed mode is used, a plurality of users (i.e., a plurality of receiving STAs) of the EHT PPDU may decode the PPDU (e.g., the data field of the PPDU) based on non-OFDMA. That is, a plurality of users of the EHT PPDU may decode a PPDU (e.g., a data field of the PPDU) received through the same frequency band. When a non-compressed mode is used, multiple users of the EHT PPDU may decode the PPDU (e.g., the data field of the PPDU) based on OFDMA. That is, a plurality of users of the EHT PPDU may receive the PPDU (e.g., the data field of the PPDU) through different frequency bands.

EHT-SIG may be constructed based on various MCS scheme. As described above, information related to the MCS scheme applied to the EHT-SIG may be included in the U-SIG. The EHT-SIG may be constructed based on the DCM scheme. The DCM scheme may reuse the same signal on two subcarriers to provide an effect similar to frequency diversity, reduce interference, and improve coverage. For example, modulation symbols to which the same modulation scheme is applied may be repeatedly mapped on available tones/subcarriers. For example, modulation symbols (e.g., BPSK modulation symbols) to which a specific modulation scheme is applied may be mapped to first contiguous half tones (e.g., 1st to 26th tones) among the N data tones (e.g., 52 data tones) allocated for EHT-SIG, and modulation symbols (e.g., BPSK modulation symbols) to which the same specific modulation scheme is applied may be mapped to the remaining contiguous half tones (e.g., 27th to 52nd tones). That is, a modulation symbol mapped to the 1st tone and a modulation symbol mapped to the 27th tone are the same. As described above, information related to whether the DCM scheme is applied to the EHT-SIG (e.g., a 1-bit field) may be included in the U-SIG. The EHT-STF of FIG. 13 may be used to enhance automatic gain control (AGC) estimation in a MIMO environment or an OFDMA environment. The EHT-LTF of FIG. 13 may be used to estimate a channel in a MIMO environment or an OFDMA environment.

Information on the type of STF and/or LTF (including information on a guard interval (GI) applied to LTF) may be included in the U-SIG field and/or the EHT-SIG field of FIG. 13.

The PPDU (i.e., EHT PPDU) of FIG. 13 may be constructed based on an example of RU allocation of FIGS. 8 to 10.

For example, a EHT PPDU transmitted on a 20 MHz band, that is, a 20 MHz EHT PPDU may be constructed based on the RU of FIG. 8. That is, a RU location of EHT-STF, EHT-LTF, and data field included in the EHT PPDU may be determined as shown in FIG. 8. A EHT PPDU transmitted on a 40 MHz band, that is, a 40 MHz EHT PPDU may be constructed based on the RU of FIG. 9. That is, a RU location of EHT-STF, EHT-LTF, and data field included in the EHT PPDU may be determined as shown in FIG. 9.

The EHT PPDU transmitted on the 80 MHz band, that is, the 80 MHz EHT PPDU may be constructed based on the RU of FIG. 10. That is, a RU location of EHT-STF, EHT-LTF, and data field included in the EHT PPDU may be determined as shown in FIG. 10. The tone-plan for 80 MHz in FIG. 10 may correspond to two repetitions of the tone-plan for 40 MHz in FIG. 9.

The tone-plan for 160/240/320 MHz may be configured in the form of repeating the pattern of FIG. 9 or 10 several times.

The PPDU of FIG. 13 may be identified as an EHT PPDU based on the following method.

The receiving STA may determine the type of the received PPDU as the EHT PPDU based on the following. For example, when 1) the first symbol after the L-LTF signal of the received PPDU is BPSK, 2) RL-SIG in which the L-SIG of the received PPDU is repeated is detected, and 3) the result of applying the modulo 3 calculation to the value of the Length field of the L-SIG of the received PPDU (i.e., the remainder after dividing by 3) is detected as 0, the received PPDU may be determined as a EHT PPDU. When the received PPDU is determined to be an EHT PPDU, the receiving STA may determine the type of the EHT PPDU based on bit information included in symbols subsequent to the RL-SIG of FIG. 13. In other words, the receiving STA may determine the received PPDU as a EHT PPDU, based on 1) the first symbol after the L-LTF signal, which is BSPK, 2) RL-SIG contiguous to the L-SIG field and identical to the L-SIG, and 3) L-SIG including a Length field in which the result of applying modulo 3 is set to 0.

For example, the receiving STA may determine the type of the received PPDU as the HE PPDU based on the following. For example, when 1) the first symbol after the L-LTF signal is BPSK, 2) RL-SIG in which L-SIG is repeated is detected, and 3) the result of applying modulo 3 to the length value of L-SIG is detected as 1 or 2, the received PPDU may be determined as a HE PPDU.

For example, the receiving STA may determine the type of the received PPDU as non-HT, HT, and VHT PPDU based on the following. For example, when 1) the first symbol after the L-LTF signal is BPSK and 2) RL-SIG in which L-SIG is repeated is not detected, the received PPDU may be determined as non-HT, HT, and VHT PPDU.

In addition, when the receiving STA detects an RL-SIG in which the L-SIG is repeated in the received PPDU, it may be determined that the received PPDU is a HE PPDU or an EHT PPDU. In this case, if the rate (6 Mbps) check fails, the received PPDU may be determined as a non-HT, HT, or VHT PPDU. If the rate (6 Mbps) check and parity check pass, when the result of applying modulo 3 to the Length value of L-SIG is detected as 0, the received PPDU may be determined as an EHT PPDU, and when the result of Length mod 3 is not 0, it may be determined as a HE PPDU.

The PPDU of FIG. 13 may be used to transmit and receive various types of frames. For example, the PPDU of FIG. 13 may be used for (simultaneous) transmission and reception of one or more of a control frame, a management frame, or a data frame.

Hereinafter, the U-SIG included in the EHT PPDU will be described in more detail.

For a 40 MHz EHT PPDU or Extended Range (ER) preamble, the U-SIG content is the same in both 20 MHz subchannels. For an 80 MHZ EHT PPDU or ER preamble, the U-SIG content is the same in all non-punctured 20 MHz subchannels. For a 160/320 MHz EHT PPDU or ER preamble, the U-SIG content is the same on all non-punctured 20 MHZ subchannels within each 80 MHz subblock and may be different from the U-SIG content in other 80 MHz subblocks.

The U-SIG-1 part of the U-SIG of the EHT MU PPDU may include PHY version identifier (B0-B2), BW (B3-B5), UL/DL (B6), BSS color (B7-B12), and TXOP (B13-B19), and U-SIG-2 part may include PPDU type and compression mode (B0-B1), validate (B2), punctured channel information (B3-B7), validate (B8), EHT-SIG MCS (B9-B10), number of EHT-SIG symbols (B11-B15), CRC (B16-B19), and tail (B20-B25).

Here, an example of a 5-bit punctured channel indication for a non-OFDMA case in the EHT MU PPDU is shown in Table 1 below.

TABLE 1

| PPDU bandwidth | Cases | Puncturing pattern | Field value |
|---|---|---|---|
| 20/40 MHz | No puncturing | [1 1 1 1] | 0 |
| 80 MHz | No puncturing | [1 1 1 1] | 0 |
| | 20 MHz puncturing | [x 1 1 1] | 1 |
| | | [1 x 1 1] | 2 |
| | | [1 1 x 1] | 3 |
| | | [1 1 1 x] | 4 |
| 160 MHz | No puncturing | [1 1 1 1 1 1 1 1] | 0 |
| | 20 MHz puncturing | [x 1 1 1 1 1 1 1] | 1 |
| | | [1 x 1 1 1 1 1 1] | 2 |
| | | [1 1 x 1 1 1 1 1] | 3 |
| | | [1 1 1 x 1 1 1 1] | 4 |

TABLE 1-continued

| PPDU bandwidth | Cases | Puncturing pattern | Field value |
|---|---|---|---|
| | | [1 1 1 1 x 1 1 1] | 5 |
| | | [1 1 1 1 1 x 1 1] | 6 |
| | | [1 1 1 1 1 1 x 1] | 7 |
| | | [1 1 1 1 1 1 1 x] | 8 |
| | 40 MHz puncturing | [x x 1 1 1 1 1 1] | 9 |
| | | [1 1 x x 1 1 1 1] | 10 |
| | | [1 1 1 1 x x 1 1] | 11 |
| | | [1 1 1 1 1 1 x x] | 12 |
| 320 MHz | No puncturing | [1 1 1 1 1 1 1 1] | 0 |
| | 40 MHz puncturing | [x 1 1 1 1 1 1 1] | 1 |
| | | [1 x 1 1 1 1 1 1] | 2 |
| | | [1 1 x 1 1 1 1 1] | 3 |
| | | [1 1 1 x 1 1 1 1] | 4 |
| | | [1 1 1 1 x 1 1 1] | 5 |
| | | [1 1 1 1 1 x 1 1] | 6 |
| | | [1 1 1 1 1 1 x 1] | 7 |
| | | [1 1 1 1 1 1 1 x] | 8 |
| | 80 MHz puncturing | [x x 1 1 1 1 1 1] | 9 |
| | | [1 1 x x 1 1 1 1] | 10 |
| | | [1 1 1 1 x x 1 1] | 11 |
| | | [1 1 1 1 1 1 x x] | 12 |
| | 320-80-40 | [x x x 1 1 1 1 1] | 13 |
| | | [x x 1 x 1 1 1 1] | 14 |
| | | [x x 1 1 x 1 1 1] | 15 |
| | | [x x 1 1 1 x 1 1] | 16 |
| | | [x x 1 1 1 1 x 1] | 17 |
| | | [x x 1 1 1 1 1 x] | 18 |
| | | [x 1 1 1 1 1 x x] | 19 |
| | | [1 x 1 1 1 1 x x] | 20 |
| | | [1 1 x 1 1 1 x x] | 21 |
| | | [1 1 1 x 1 1 x x] | 22 |
| | | [1 1 1 1 x 1 x x] | 23 |
| | | [1 1 1 1 1 x x x] | 24 |

In the puncturing pattern of Table 1. 1 denotes a non-punctured subchannel, and x denotes a punctured subchannel. The puncturing granularity for the 80 MHz and 160 MHz PPDU bandwidths may be 20 MHz, and the puncturing granularity for the 320 MHz PPDU bandwidth may be 40 MHz.

Next, the U-SIG-1 part of the U-SIG of the EHT TB PPDU may include a version identifier (B0-B2), BW (B3-B5), UL/DL (B6), BSS color (B7-B12), TXOP (B13-B19), and disregard (B20-B25), and U-SIG-2 part may include PPDU type and compression mode (B0-B1), validate (B2), spatial reuse 1 (B3-B6), spatial reuse 2 (B7-B10), disregard (B11-B15), CRC (B16-B19), and tail (B20-B25).

As described above, the U-SIG field of the EHT MU PPDU includes 5-bit punctured channel information, but the EHT TB PPDU does not include punctured channel information. This is because it is assumed that the EHT TB PPDU is constructed according to resource allocation indicated by the trigger frame or TRS control information, so the STA does not need to inform the AP of the resource information of the EHT TB PPDU.

In addition, even if the trigger frame or TRS control information as described above is received, the STA may not respond with the HE TB PPDU. For example, if, in the non-AP STA, a common information field included in the trigger frame or one or more subfields of an user field addressed to the non-AP STA or selected by the non-AP STA are not recognized, supported, or have an unsatisfied value, the corresponding non-AP STA may choose not to respond to the trigger frame. Similarly, if, in the non-AP STA, a TRS control subfield included in a frame addressed to the non-AP STA is not recognized by the non-AP STA, is not supported, or has an unsatisfied value, the corresponding non-AP STA may choose not to respond to the TRS control subfield.

WLAN Sensing Procedure

The WLAN sensing procedure (hereinafter referred to as sensing procedure) refers to a procedure for obtaining recognition information about the surrounding environment based on information about the channel environment (or state) included in the signal transmitted from the transmitting end to the receiving end. Each STA may provide additional services that can be applied in various forms in real life based on information about the surrounding environment obtained through sensing procedures.

Here, information about the surrounding environment may include, for example, gesture recognition information, fall detection information, intrusion detection information, user movement detection, health monitoring information, or pet movement detection.

The sensing procedure may be initiated by a sensing initiator. A sensing initiator refers to an STA that indicates one or more STAs with a sensing function (or capability) to initiate a sensing session using a (WLAN) signal.

For example, the sensing initiator may transmit a signal for sensing (e.g., a PPDU for sensing measurement) to one or more STAs with a sensing function, or may transmit a frame requesting transmission of a signal for sensing.

A sensing session refers to a time period (or instance) in which a series of sensing procedures are performed. In other words, a sensing session refers to a time interval (or instance) in which various protocols related to the transmission and reception of signals for sensing are exchanged, or an instance of a sensing procedure having associated operational parameters of the instance. Sensing sessions may be allocated to STAs periodically or aperiodically as needed.

A sensing session may consist of a (sensing) setup phase, a (sensing) measurement setup phase, (sensing measurement instance phase), a reporting phase, a termination phase, etc. The negotiation phase (or process) for determining the operating parameters may be a subphase of the setup phase (i.e., a part of the setup phase) or may be configured independently from the setup phase.

Additionally, a sensing session may consist of multiple sub-sessions, and each sub-session may include a measurement phase and a reporting phase. Here, the sub-session may be expressed as a sensing burst, measurement instance, or measurement burst.

Sensing responder refers to an STA participating in a sensing session initiated by a sensing initiator. The sensing responder may transmit the results obtained by performing the sensing operation (e.g., channel state information, etc.) to the sensing initiator, or may transmit a signal for sensing to the sensing initiator according to the sensing initiator's indications.

A sensing transmitter refers to an STA that transmits a signal for sensing (e.g., PPDU for sensing measurement, etc.) during a sensing session (or burst). A sensing receiver refers to an STA that receives a signal for sensing during a sensing session (or burst).

When a sensing session consists of a plurality of sensing bursts, the sensing transmitter/receiver within all sensing bursts may be the same, but is not limited to this. The sensing transmitter/receiver within some sensing bursts may be different, and the sensing transmitter/receiver may vary for each sensing burst.

Within a sensing session, a sensing initiator may operate as a sensing transmitter or a sensing receiver, and a sensing responder may operate as a sensing receiver or a sensing transmitter.

And, during each sensing burst that constitutes a sensing session, signal transmission for sensing by the sensing transmitter and feedback transmission by the sensing receiver may be performed. As another example, during each sensing burst, only signal transmission for sensing by the sensing transmitter may be performed.

Each sensing burst may be defined continuously in time, but is not limited to this, and may be defined discontinuously in time. If each sensing burst is defined discontinuously in time, the sensing burst may be defined the same as or similar to the transmission opportunity (TXOP). Here, TXOP means a time interval in which a specific STA has the right to start a frame exchange sequence on a wireless medium (WM).

Sensing Procedure Based on Sensing Group

Communication performed in a wireless LAN system is carried out over a broadband as various techniques such as channel aggregation and channel bonding are utilized, and communication over an expanded broadband is also being discussed. When performing a sensing operation in a more extended broadband, each STA can obtain more detailed and accurate information about the channel environment.

However, when performing a sensing operation over a wider bandwidth and transmitting and receiving the resulting results (e.g., channel environment/state information, etc.), there is a problem that the power consumption of the corresponding STA may increase further. In particular, when an STA performing a sensing operation receives power from a battery, problems related to power consumption may have a significant impact on the STA.

Therefore, in order to obtain more detailed information about the channel environment (i.e., increase the accuracy of the sensing operation) and reduce power consumption, the present disclosure discloses a sensing procedure based on a sensing group. Here, the sensing group refers to a set of one or more STAs with sensing functions (or capabilities).

By forming a group for sensing with one or more STAs having a sensing function, a sensing procedure based on a sensing group may be performed. The sensing procedure based on the sensing group refers to a procedure in which all STAs (or a certain number of STAs) in the group perform sensing operations (sequentially) and exchange feedback accordingly.

When a sensing procedure based on a sensing group is performed, multiple information about the channel environment may be obtained compared to a method using a single transmitter and receiver. Accordingly, STAs included in the group may obtain/utilize more accurate sensing information.

And, according to an embodiment of the present disclosure, power consumption according to measurement of the sensing responder may be reduced by adjusting the granularity of the channel environment measurement of the sensing responder. Additionally, according to an embodiment of the present disclosure, feedback transmission is controlled according to the channel environment of the sensing responder, thereby reducing power consumption due to feedback in an operating environment where power consumption is a concern.

Examples of this disclosure may be applied to the newly proposed IEEE 802.11bf standard-based wireless LAN. Below, the sensing procedure based on a sensing group will be described.

Figure 14:
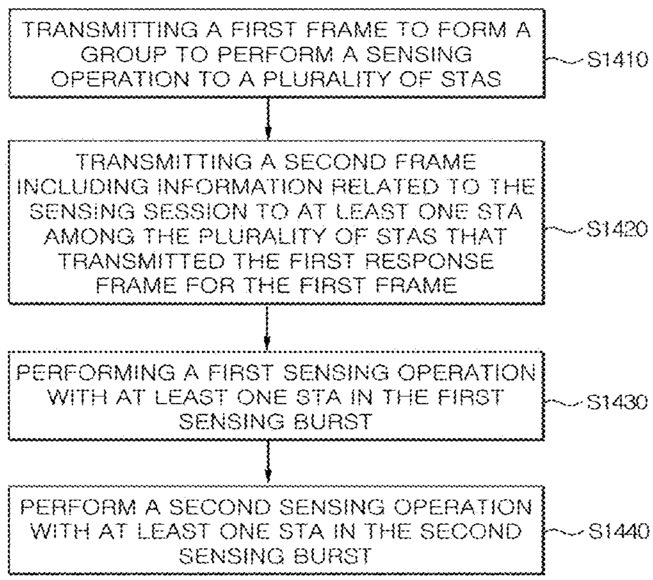
FIG. 14 is a diagram illustrating a method by which a first STA performs a sensing procedure, according to an embodiment of the present disclosure.

FIG. 14 is a diagram illustrating a method by which a first STA performs a sensing procedure, according to an embodiment of the present disclosure.

The first STA may transmit a first frame to form a group to perform a sensing operation to a plurality of STAs (S1410). Here, the first STA may be expressed as the owner or/and sensing initiator of the (sensing) group. Additionally, the first frame may also be expressed as a group initiation frame.

At this time, the plurality of STAs may be STAs that support a (group) sensing function (or capability). For example, the first STA may receive capability information related to sensing operations from a plurality of STAs. Accordingly, the first STA may determine that a plurality of STAs support the sensing operation function and transmit the first frame to the plurality of STAs.

For example, the first STA may transmit the first frame to a plurality of STAs using a polling-based method. Specifically, the first frame may be sequentially transmitted to each of a plurality of STAs. The order in which the first frame is transmitted may be predefined or determined based on specific criteria. At this time, when the first frame is transmitted to each of a plurality of STAs, the first frame may specify each of the plurality of STAs.

As another example, the first STA may transmit the first frame to a plurality of STAs using an OFDMA-based method. Specifically, the first frame may include resource unit (RU) information (or RU scheduling information) allocated to each of a plurality of STAs. And, at least one STA that will participate in the group that will perform the sensing operation may transmit the first response frame based on the corresponding RU information.

As another example, the first STA may transmit the first frame to a plurality of STAs using an EDCA-based method. Specifically, the first STA may transmit the first frame to a plurality of STAs in a broadcast manner. In addition, the first STA may determine at least one STA that transmitted the first response frame during a preset time after the first frame was transmitted among the plurality of STAs as an STA that will participate in the group that will perform the sensing operation.

The first STA may transmit a second frame including information related to the sensing session to at least one STA (i.e., (responder) STAs who participated in the group) among the plurality of STAs that transmitted the first response frame for the first frame (S1420).

Here, at least one STA that transmitted the first response frame is an STA participating in the group and may be expressed as a member of the group. Among the plurality of STAs, an STA that does not transmit a response frame or transmits a frame indicating that it will not participate in the group may not be included in the at least one STA. And, the second frame may also be expressed as a setup start frame.

For example, the second frame may include at least one of information on the cycle of the sensing session, information on the start/end time of the sensing session, information on the sensing burst included in the sensing session, or information on the group security key.

The first STA may perform a first sensing operation with at least one STA in the first sensing burst during the sensing session (S1430).

Here, the first sensing operation may include transmitting a sensing frame from the first STA to at least one STA.

In describing the present disclosure, a sensing frame may include an NDP, but is not limited thereto and may include a new frame or packet.

At this time, the first sensing operation may be performed based on the third frame (e.g., trigger frame or NDP announcement frame). The third frame may include transmission-related parameters (for the first sensing operation) (e.g., MCS, number of spatial streams, etc.).

As an example, the first STA may transmit a fourth frame (e.g., trigger frame, etc.) requesting a feedback frame for the sensing frame to at least one STA. At least one STA may transmit a feedback frame for the sensing frame to the first STA based on the fourth frame.

As another example, the first STA may transmit a signal (e.g., polling signal/frame, etc.) to at least one STA to check whether the sensing operation can be performed before performing the first sensing operation. The polling signal/frame may include RU information for responding to whether at least one STA can participate in the sensing operation. The first STA may perform the first sensing operation with the STA(s) that respond that they can perform the sensing operation in the first sensing burst among at least one STA.

The first STA may perform a second sensing operation with at least one STA in the second sensing burst (S1440).

Specifically, a sensing session may include one or more sensing bursts. If a second sensing burst following the first sensing burst is included in the sensing session, a second sensing operation may be performed in the second sensing burst.

Here, the second sensing operation may include transmitting a sensing frame from the second STA to the first STA and the remaining STAs (excluding the second STA) among the at least one STA.

As another example, after the sensing measurement instance (i.e., the second sensing burst) ends (or/and before the sensing session ends), the first STA may transmit a fifth frame requesting a feedback frame for the sensing frame transmitted in the second sensing burst to the second STA.

At this time, the fifth frame may include information related to the sensing frame transmitted in the second sensing burst (e.g., information that can identify the transmission of a sensing frame (or sounding signal) transmitted in the second sensing burst, etc.) or information related to the second sensing burst (e.g., information that can identify the second sensing burst, etc.). That is, the first STA may request a feedback frame for the sensing frame transmitted in the specific sensing burst from the second STA even after the specific sensing burst ends.

And, when a third sensing burst following the second sensing burst is included in the sensing session, a third sensing operation may be performed in the third sensing burst. Here, the third sensing operation may include one of transmitting a sensing frame to the first STA or transmitting a sensing frame to the first STA and the second STA.

That is, the third STA, which is a sensing responder, may transmit a sensing frame only to STA 1, the sensing initiator, and may transmit a sensing frame to the first STA and other sensing responders (e.g., STA 2). Also in S1430, the second STA may transmit a sensing frame only to the first STA, or may transmit a sensing frame to both the first STA and the third STA.

Figure 15:
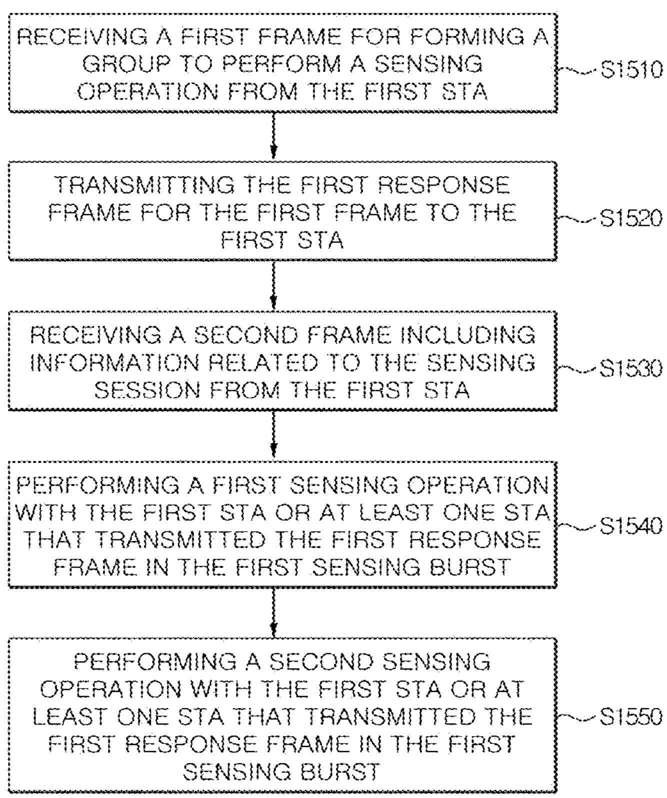
FIG. 15 is a diagram illustrating a method by which a second STA performs a sensing procedure, according to an embodiment of the present disclosure.

FIG. 15 is a diagram illustrating a method by which a second STA performs a sensing procedure, according to an embodiment of the present disclosure.

The second STA may receive a first frame for forming a group to perform a sensing operation from the first STA (S1510). Here, the first STA may be the owner or/and the sensing initiator of the (sensing) group. And, the second STA may be an STA with a (group) sensing function (or capability). Additionally or alternatively, the second STA may be an STA that transmitted capability information related to a (group) sensing operation (i.e., inter-group sensing operation) to the first STA.

The second STA may transmit the first response frame for the first frame to the first STA (S1520). Since the method of exchanging the first frame and the first response frame between the first STA and the second STA has been described above, redundant description will be omitted.

The second STA may receive a second frame including information related to the sensing session from the first STA (S1530).

The second STA may perform a first sensing operation with the first STA or another STA (i.e., STAs excluding the second STA among the STAs included in the group) that transmitted the first response frame in the first sensing burst during the sensing session (S1540).

The second STA may perform a second sensing operation with the first STA or another STA that transmitted the first response frame in the first sensing burst during the sensing session (S1550).

Here, the second frame and the first and second sensing operations, etc. have been described in detail with reference to FIG. 14, so redundant description will be omitted.

Below, the (sensing) group-based sensing procedure will be described in more detail.

One sensing group may have a sensing group owner (hereinafter referred to as owner), and the owner may serve as a sensing initiator. In describing the present disclosure, a sensing group member may refer to other STAs included in the group excluding the owner.

When a sensing agent is located in the owner, the owner may be responsible for collecting and analyzing channel information from one or more STAs (responders) for each sensing session.

If a sensing agent is located in an entity other than the owner (i.e., there is no sensing agent in the owner), the owner may transmit measurement results (e.g., channel information, etc.) to the entity. In describing the present disclosure, the entity where the sensing agent is located is referred to as a central entity. The central entity may be implemented as an AP or another entity located in the cloud.

If the owner is not the central entity, information related to the initiator (e.g., information on the STA serving as the sensing initiator, etc.) may not be changed for each sensing session or for all sensing sessions. That is, information related to the initiator may be configured statically. However, this is only an example, and if the owner is not the central entity, information related to the sensing initiator may change for each sensing session or after a certain sensing session has elapsed.

Below, each phase of the sensing procedure will be described in detail.

Group Formation Phase (Phase 1)

A group formation phase may be performed as the first phase of the sensing procedure. The group formation phase refers to a phase in which the central entity (or sensing initiator) asks STAs with (group) sensing functions (or capabilities) about their intention to participate in a (collaborative) sensing group.

In describing the present disclosure, the frame in which the central entity asks STAs with sensing functions about their intention to participate in a sensing group is referred to as a group initiation frame (or group initiation polling frame, group initiation information, polling frame, etc.).

Group initiation information may include, for example, identification information of the sensing initiator, identification information of the responding STA (e.g., AID for the responding STA if the responding STA is associated with a BSS, or UID for the responding STA if the responding STA is not associated with a BSS, etc.), group ID for identification of the group to which the responding STA belongs, resource information for the responding STA to transmit its willingness, response time limits (related to how EDCA (enhanced distributed channel access)-based group formation initiation frames are transmitted), etc.

The group formation phase of asking each STA about their intention to participate in a (collaborative) sensing group may be configured as a sub-phase (i.e., a part of the setup phase) of the setup phase during the sensing session, or may be configured independently from the setup phase. The setup phase may be a sensing session or measurement setup phase. If the group formation phase is configured independently from the setup phase, after the group formation phase is performed for the STAs, the setup phase may be performed pairwise for the STAs.

First, a case where the sensing group formation phase is configured independently from the setup phase will be described.

The sensing group forming phase may be performed using a polling-based method, OFDMA-based method, or EDCA-based method.

The polling-based method refers to a method in which the sensing initiator transmits a frame asking each of the responding STAs whether to participate in the sensing group, and each responding STA transmits a response frame to the sensing initiator. The OFDMA-based method refers to a method in which a frame asking whether or not to participate in a sensing group is transmitted to one or more responding STAs, and the responding STAs transmit a response frame in response to this through a resource unit (RU) allocated to them. The EDCA-based method refers to a method of informing responding STAs of the time to transmit a response frame and determining the STAs that transmitted the response frame (through EDCA-based channel access) within that time as STAs participating in the sensing group.

Each method may be used independently, but is not limited to this and may also be used in combination. For example, the group formation phase may be performed using a different method for each sensing session, or the group formation phase may be performed by merging each method.

Figure 16:
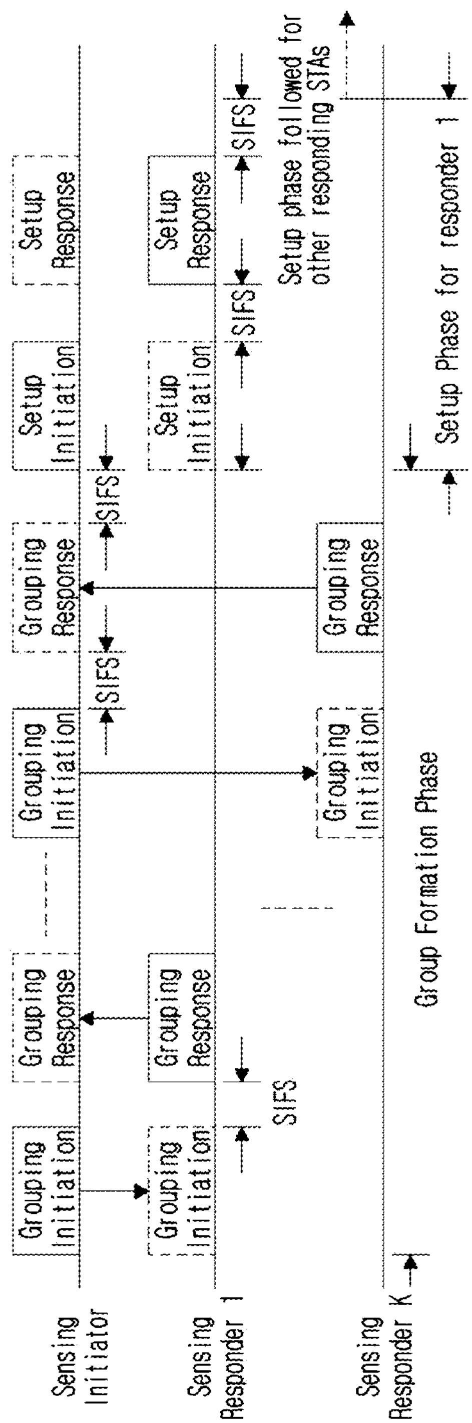
FIG. 16 illustrates a case in which the sensing group formation phase is performed using a polling-based method applicable to the present disclosure.

FIG. 16 illustrates a case in which the sensing group formation phase is performed using a polling-based method applicable to the present disclosure.

In the group formation phase, the sensing initiator may transmit a group initiation frame to the sensing responder STA 1 (hereinafter referred to as sensing responder 1), and responder 1 may transmit a response frame to the sensing initiator. Afterwards, the sensing initiator may transmit a group start frame to the sensing responder STA K (hereinafter referred to as sensing responder K), and the sensing responder K may transmit a response frame thereto to the sensing initiator.

Here, the group initiation frame may specify each sensing responder. That is, the sensing initiator may (sequentially) transmit group initiation frames designated for each sensing responder. Additionally, the group initiation frame may include a group ID. The group response frame may indicate whether it is possible to participate in (collaborative) group sensing.

After the group formation phase is completed (for example, after a response frame is received from the last sensing responder and SIFS has elapsed), a setup phase for each sensing responder may proceed. That is, after group formation for all candidate sensing responders is completed, the setup phase may begin. The setup phase may be conducted for sensing responders who have expressed their intention to participate in the sensing group.

Figure 17:
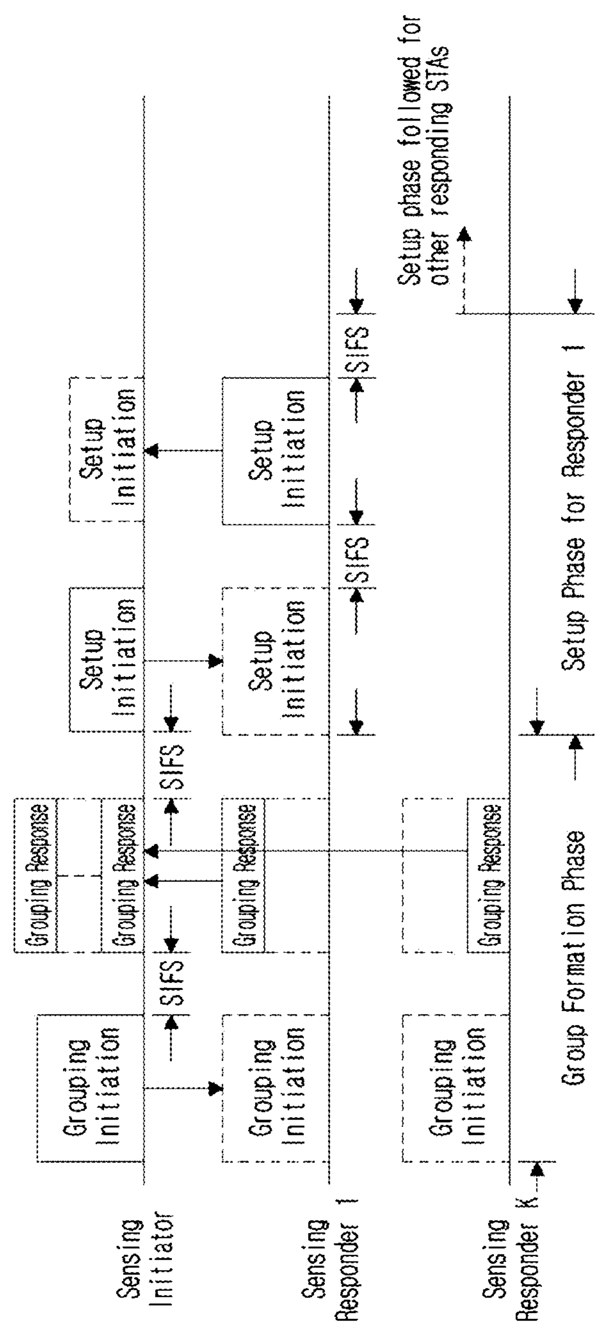
FIG. 17 illustrates a case in which the sensing group formation phase is performed using the OFDMA-based method applicable to the present disclosure.

FIG. 17 illustrates a case in which the sensing group formation phase is performed using an OFDMA-based method applicable to the present disclosure.

In the group formation phase, the sensing initiator may transmit a group initiation frame to each sensing responder.

Here, the group start frame may include RU information for each sensing responder. Each sensing responder may transmit a response frame based on the RU information allocated to it (on the same time resource). And, the group start frame may include a group ID and an ID list of each STA.

For example, a trigger frame (e.g., a trigger frame that allocates resources for (TB) PPDU transmission and requests the transmission) may be used as a group start frame, and the sensing responder may be a HE STA, an EHT STA, or an STA in a new format after EHT.

After a response frame is transmitted from each sensing responder to the sensing initiator, a setup phase for each sensing responder may proceed (sequentially).

Figure 18:
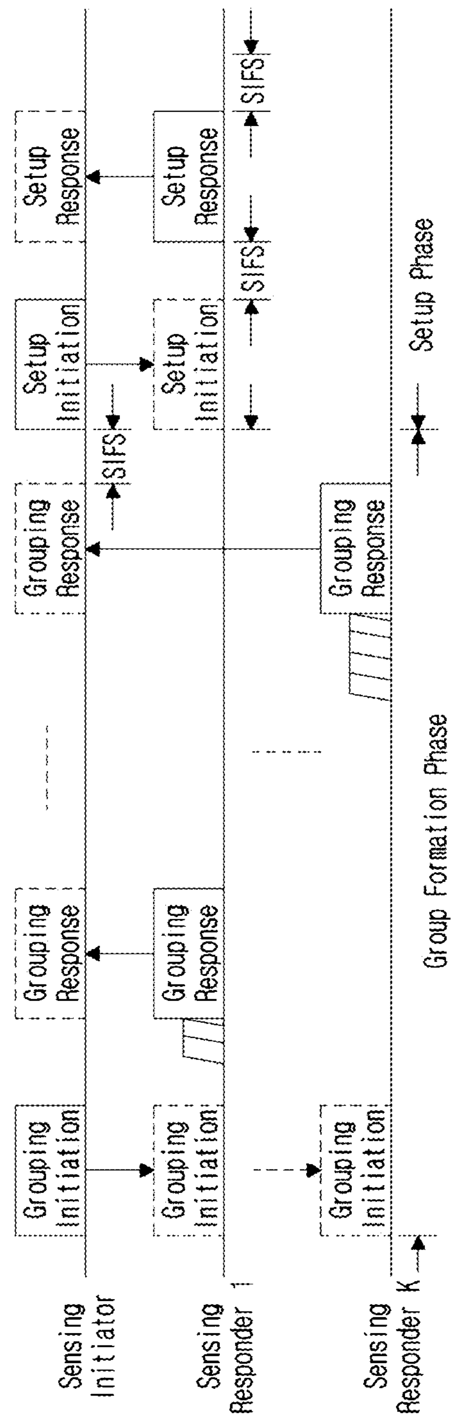
FIG. 18 illustrates a case in which the sensing group formation phase was performed in an EDCA-based method applicable to the present disclosure.

FIG. 18 illustrates a case in which the sensing group formation phase is performed in an EDCA-based method applicable to the present disclosure.

In the group formation phase, the sensing initiator may transmit a group initiation frame to each sensing responder. At this time, the group start frame may not specify the ID of each sensing response STA. That is, the sensing initiator may transmit the group initiation frame to each responding STA in a broadcast manner.

STAs that transmit a response frame within a certain time may be considered STAs participating in the sensing group. A certain time period (duration) may be adjusted depending on the sensing application (that is, the embodiment in which the sensing operation is utilized/applied). For example, in the case of an application that requires collaboration of a large number of STAs, the length of the certain time period may be long.

Additionally, information about a certain time period may be included in the group start frame, but is not limited to this, and the length of the certain time section may be defined in advance.

Hereinafter, a case where the group formation phase is performed in conjunction with the setup phase (or a case where the group formation phase is a part of the setup phase) will be described.

The sensing initiator may inquire whether each of one or more responding STAs participates in the sensing group and proceed with the setup phase in a pairwise manner with STAs that can participate. The sensing initiator may provide additional information required for group (or collaborative) sensing to the responding STA.

Here, additional information may be provided through a previously defined frame or a newly defined frame (e.g., setup start frame). Additional information may include a group security key, information about the period of the sensing session (if sensing sessions are conducted periodically), information about the start/end time of the sensing session, information about the sensing burst within the sensing session (e.g., the number of sensing bursts defined within one sensing session, the number of signals (or sensing frames) that can be transmitted within a sensing burst, the period and section of the signal transmitted within a sensing burst, etc.), etc.

The additional information may be transmitted from the sensing initiator to responding STAs for each sensing burst. Here, the sensing burst may be equal to or smaller than the number of STAs in the sensing group.

And, when a group sensing operation is performed, one or more responding STAs may use the group security key. The group security key refers to information used to protect MAC/PHY frame transmission of STAs (including sensing initiators) within a sensing group.

For example, the group security key may be transmitted to STAs within the sensing group for each sensing session. As another example, the group security key may be maintained for a certain sensing session and then transmitted to STAs within the sensing group. Alternatively, when the number of responding STAs participating in group sensing changes (e.g., increases or decreases), a new group security key may be transmitted to STAs in the sensing group.

The group formation phase performed in conjunction with the setup phase may be performed using a polling-based method, but is not limited to this and may also be performed using an OFDMA-based method or an EDCA-based method.

Figure 19:
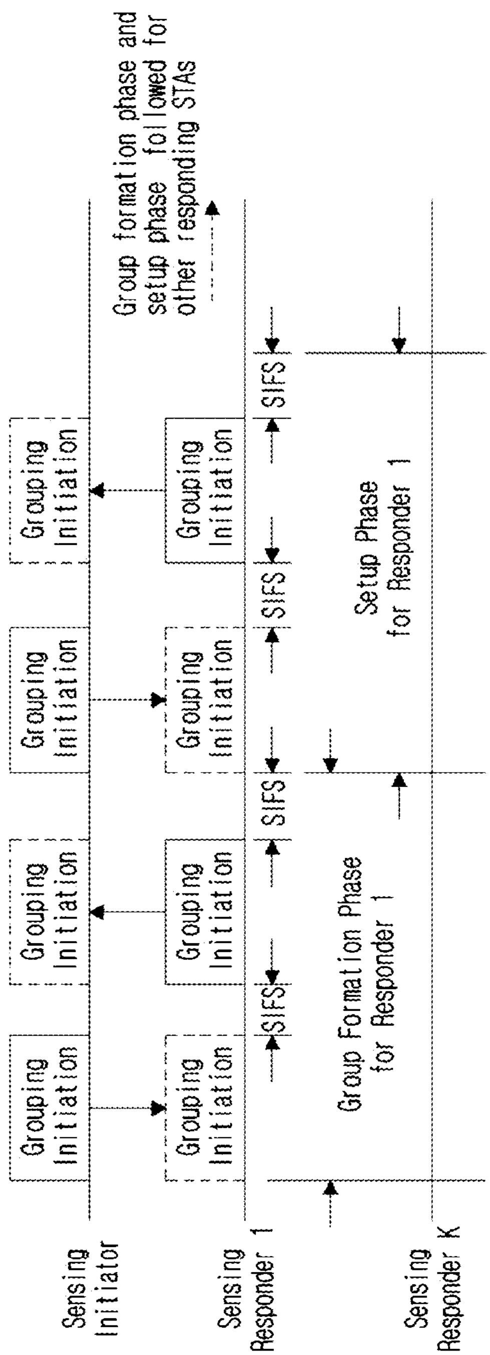
FIG. 19 illustrates a case in which the sensing group formation phase associated with the setup step is performed in a polling-based method applicable to the present disclosure.

FIG. 19 illustrates a case where the sensing group formation phase linked to the setup phase is performed in a polling-based method.

After completing the group formation phase and setup phase with one STA, the sensing initiator may proceed with the group formation phase and setup phase with another STA. That is, the setup phase for a specific responder may be performed after receiving a response frame to the group start frame from a specific sensing responder (or after SIFS has elapsed).

For example, as shown in FIG. 19, in the group formation phase for sensing responder 1, the sensing initiator may transmit a group initiation frame to the sensing response STA 1 (i.e., sensing responder 1), and sensing responder 1 may transmit a response frame to the sensing initiator. Afterwards, the sensing initiator may transmit a setup start frame to sensing responder 1, and sensing responder 1 may transmit a response frame to the sensing initiator. After that, the sensing initiator may proceed with the group formation phase and setup phase with other responders.

Here, the group formation start frame may specify each responder and may include a group ID. The response frame to the group formation start frame may indicate whether the sensing responder will be included in the sensing group.

The setup initiation frame may include a group security key for MAC/PHY frame protection. Within group (or collaborative) sensing, the same group security key may be shared (similar to a multicast key) among sensing responders.

Setup initiation and setup response frames may be exchanged between the sensing initiator and responder several times to obtain agreement on the operating parameters to be used. A negotiation phase (process) may be included in the setup phase.

After the (collaborative sensing) setup phase is performed with each responding STA, the sensing initiator may collect the results according to the setup phase and transmit them to the responding STAs whose participation in the sensing group has been confirmed. The results of the setup phase may be provided using an existing frame format (or variant), or may be provided using a new frame (e.g., a setup confirmation frame). The result of the setup phase may be protected using a group security key shared through the setup process, and responding STAs that have received the result may transmit a response frame for the result to the response initiator.

Sensing Initiator-Based Measurement Phase (Phase 2)

Each sensing session may be initiated by the group owner after obtaining channel use rights through channel access competition. At this time, the group owner may become the sensing initiator. The sensing initiator may transmit a frame indicating the start of a sensing session or/and a frame containing information (or transmission-related information) related to the start of the sensing session to the responding STA.

Each measurement phase may begin by asking (or confirming) the possibility of participation in the current measurement phase for STAs that expressed their intention to participate in the collaborative (or group) sensing operation in the group formation phase. Even if the intention to participate is expressed in the setup phase, a specific STA included in the sensing group may not participate in the current measurement phase depending on its current status (e.g., participating in data exchange, etc.).

The operation of asking (or/and confirming) the intention to participate in the current measurement phase may be initiated when the sensing initiator transmits a polling signal (or frame) to one or more STAs that expressed the intention to participate in the setup phase. The polling signal may be transmitted using a MU-RTS (Multi-User Request to Send) frame. The MU-RTS frame may include information about whether one or more STAs included in the sensing group in the setup phase may participate in the current measurement phase and/or RU information capable of sending a response thereto.

A frame indicating the start of a sensing session and a frame including information related to the start of the sensing session may be combined and implemented as a single frame, but the present disclosure is not limited thereto and may be implemented as a separate frame.

Information related to the initiation of a sensing session may be transmitted by a trigger frame or/and an NDP announcement frame. The information may also be included in a beacon frame. If information about the beacon frame is not included, it may be included in information related to the start of a sensing session by a trigger frame or/and NDP announcement frame.

Here, information related to the initiation of a sensing session may include broadband channel information to be used for sensing, measurement unit size (granularity) information for feedback on sensing information, the number of basic bandwidths to be considered when transmitting feedback, information about the basic bandwidth allocated to each sensing responder, etc.

For example, it is assumed that the bandwidth to be used for sensing (or measurement) is 80 MHz, the basic bandwidth is 20 MHz, the unit of measure size is 4 subcarriers, STA 2 is allocated the first and third 20 MHz of 80 MHZ, and STA 3 is allocated the second and fourth 20 MHz basic bandwidth.

At this time, STA 2 as sensing responder may measure the channel environment of two bandwidths of 20 MHz (i.e., first and third 20 MHz) allocated among the 80 MHZ bandwidth, and measure four subcarriers as one unit for each 20 MHz bandwidth and feed back channel state information to the sensing initiator.

If the information related to the initiation of the sensing session does not include information about the number of basic bandwidth allocated to the sensing responders, responders may measure four subcarriers as a unit for two 20 MHz bandwidths (e.g., a specific bandwidth selected among bandwidths ordered in order of good channel environment or high channel quality value) selected among the wide bandwidths and transmit channel state information to the sensing initiator. At this time, information related to starting a sensing session may include indication information to use two 20 MHz channels.

Information related to the start of a sensing session may be changed for each sensing session, or may be changed after a certain period of time (e.g., after a designated number of sensing sessions). Through this change, the bandwidth and location to be measured by each responding STA may change.

Additionally, the frame indicating the start of a sensing session may be transmitted based on an existing frame (e.g., trigger frame and/or NDP announcement frame, etc.), or may be newly defined. At this time, the NDP announcement frame or the newly defined frame may include an indicator indicating the purpose of the frame (i.e., the purpose of indicating the start of sensing).

A frame indicating the start of a sensing session may include transmission-related parameters. For example, the transmission-related parameters may include at least one of MCS, number of spatial streams (in the case of MIMO), or transmission power.

Additionally, a frame indicating the start of a sensing session may be transmitted by a sensing transmitter for each sensing burst. And/or, a frame indicating the start of a sensing session may be transmitted by the sensing initiator at the start of the sensing session.

The sensing transmitter may transmit a sounding signal to the sensing receiver using a wide bandwidth. Here, the sounding signal may be transmitted using the existing NDP, but is not limited to this, and may be transmitted through a newly defined frame or packet. For more accurate estimation of the channel environment, one or more NDPs may be transmitted using a given time interval (e.g., SIFS).

And, the interval between sensing bursts may be SIFS, but other time intervals may be used. When the different time intervals are used as the intervals between sensing bursts, a method to prevent channel use by other STAs (e.g., OBSS STAs) that do not participate in sensing may be used. For example, transmission of a control frame (e.g., CTS-to-itself, etc.) by an STA performing the role of a sensing transmitter in a previous sensing burst may be performed before the start of a new sensing burst. Alternatively, transmission of a control frame by the sensing initiator (group owner) may be performed before the start of a new burst.

Figure 20:
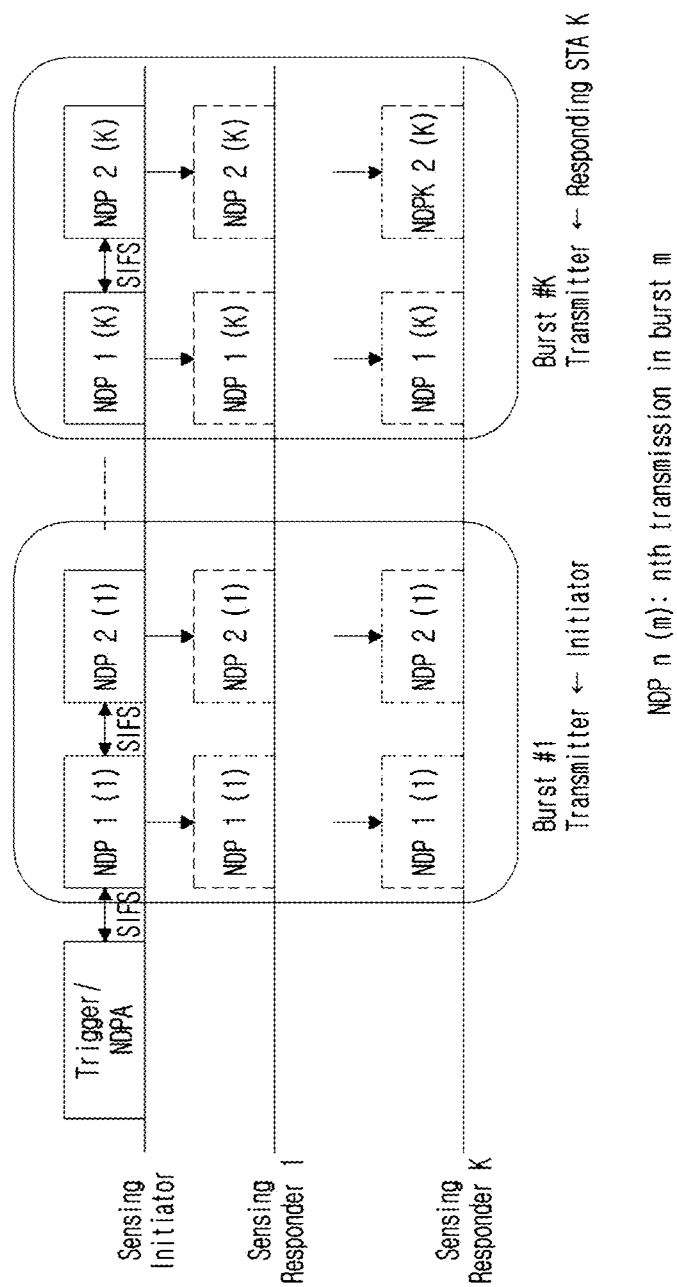
FIG. 20 is a diagram illustrating a measurement phase based on a sensing initiator that can be applied to the present disclosure.

FIG. 20 is a diagram illustrating a measurement phase based on a sensing initiator. The initiator may transmit a trigger frame and/or an NDP announcement frame including information indicating the start of a sensing session and/or information related to the start of the sensing session to each responder STA.

After the trigger frame and/or NDP announcement frame are transmitted and SIFS has elapsed, the initiator may transmit one or more NDPs per (sensing) burst. FIG. 20 shows a case where one or more NDPs are transmitted for each burst after one trigger frame and/or NDP announcement frame is transmitted. However, it is not limited to this, and a trigger frame and/or an NDP announcement frame may be transmitted before the NDP is transmitted for each burst.

Responder-Based Measurement Phase (Phase 2)

Each sensing session may be initiated by the group owner after obtaining channel use rights through channel access competition. At this time, the group owner may become the sensing initiator. The sensing initiator may transmit a frame indicating the start of a sensing session or/and a frame containing information (or transmission-related information) related to the start of the sensing session to the responding STA.

A frame indicating the start of a sensing session and a frame containing information related to the start of the sensing session may be merged and implemented as a single frame, but the present disclosure is not limited thereto and may be implemented as a separate frame.

Information related to the initiation of a sensing session may include information (e.g., wide bandwidth channel information, basic bandwidth unit information to be used by each STA, etc.) to be used by other STAs (i.e., sensing responder STAs) that will perform the role of a sensing transmitter when performing a transmission operation.

For example, information related to the initiation of a sensing session may include information about the basic bandwidth that the sensing responder will use for transmission as a transmitter. It is assumed that the bandwidth that the sensing initiator must measure as a responder is 80 HMz, the basic bandwidth is 20 MHz, STA 2 is allocated the first and third 20 MHz of 80 MHz, and the second and fourth 20 MHz basic bandwidth are allocated to STA 3. At this time, when STA 2, the sensing responder, performs the role of a transmitter, it may transmit a signal to measure the channel environment of two allocated 20 MHz bandwidths (the first and third bandwidths) among the 80 MHz bandwidth.

Information related to the start of a sensing session may be changed for each sensing session, or may be changed after a certain period of time (e.g., after a designated number of sensing sessions). Through this change, the bandwidth and location to be measured by each responding STA may change.

Additionally, the frame indicating the start of a sensing session may be transmitted based on an existing frame (e.g., trigger frame and/or NDP announcement frame, etc.), or may be newly defined. At this time, the NDP announcement frame or the newly defined frame may include an indicator indicating the purpose of the frame (i.e., the purpose of indicating the start of sensing).

A frame indicating the start of a sensing session may include transmission-related parameters. For example, the transmission-related parameters may include at least one of MCS, number of spatial streams (in the case of MIMO), or transmission power.

Additionally, a frame indicating the start of a sensing session may be transmitted by a sensing transmitter for each sensing burst. And/or, a frame indicating the start of a sensing session may be transmitted by the sensing initiator at the start of the sensing session.

During a sensing session, STAs serving as sensing responders may transmit sounding signals using the allocated bandwidth or the entire bandwidth during the sensing burst specified by group information. Here, the sounding signal may be transmitted using the existing NDP, but is not limited to this, and may be transmitted through a newly defined frame or packet. For more accurate estimation of the channel environment, one or more NDPs may be transmitted using a given time interval (e.g., SIFS).

And, the interval between sensing bursts may be SIFS, but other time intervals may be used. When the different time intervals are used as the intervals between sensing bursts, a method to prevent channel use by other STAs (e.g., OBSS STAs) that do not participate in sensing may be used. For example, transmission of a control frame (e.g., CTS-to-itself, etc.) by an STA acting as a transmitter in a previous burst may be performed before the start of a new burst.

Alternatively, transmission of a control frame by the sensing initiator (group owner) may be performed before the start of a new burst.

STAs participating in sounding signal transmission in each burst may be the same. However, this is only one embodiment, and the STAs participating in sounding signal transmission may be different for each burst.

Figure 21:
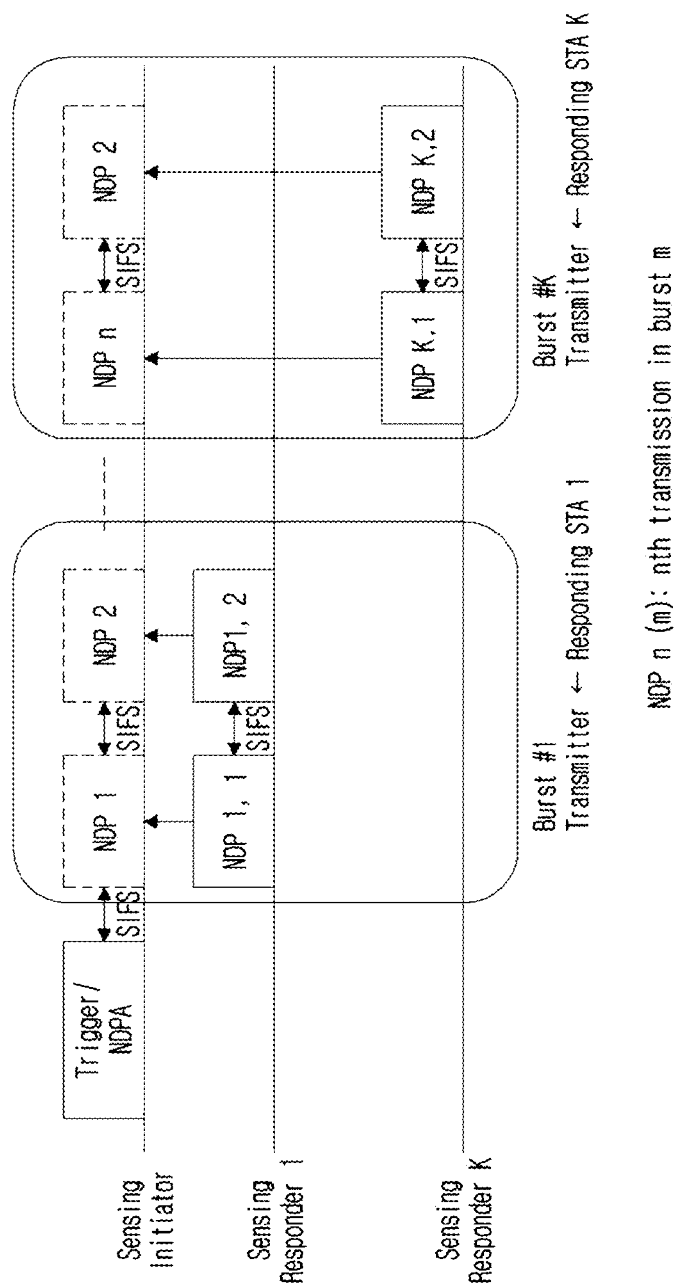
FIG. 21 is a diagram illustrating a sensing responder-based measurement phase that can be applied to the present disclosure.

FIG. 21 is a diagram illustrating a measurement phase based on a sensing responder. The sensing initiator may transmit a trigger frame and/or an NDP announcement frame including information indicating the start of the sensing session and/or information related to the start of the sensing session to each responder STA.

After the trigger frame and/or NDP announcement frame are transmitted and SIFS has elapsed, each sensing responder may transmit one or more NDPs for each sensing burst to the sensing initiator. For example, sensing responder 1 may transmit NDP to sensing initiator number 2 in sensing burst 1. And, sensing responder 2 can transmit NDP to sensing initiator number 2 in sensing burst 2.

FIG. 21 shows a case where one or more NDPs are transmitted for each burst after one trigger frame and/or NDP announcement frame is transmitted. However, it is not limited to this, and a trigger frame and/or an NDP announcement frame may be transmitted before the NDP is transmitted for each burst.

Sensing Initiator-Based Reporting Phase (Phase 3)

During a sensing session, sensing responders who assume the role of sensing receivers may transmit a feedback frame about the channel environment (or state) to the sensing initiator according to the number of basic bandwidths allocated by the sensing initiator or selected by themselves.

For example, it is assumed that the bandwidth to be measured through the trigger frame/NDP announcement frame is 80 MHz, the default bandwidth is 20 MHz, the unit of measure size is 4 subcarriers, STA 2 is allocated the first and third 20 MHz basic bandwidth out of 80 MHZ, and STA 3 is allocated the second and fourth 20 MHz primary bandwidth.

At this time, Sensing Responder 2 (STA 2) may measure the channel environment (or state) of two allocated 20 MHz bandwidths (first and third bandwidths) among the 80 MHz wide bandwidth. And, sensing responder 2 can measure four subcarriers as one unit for 20 MHz bandwidths and feed back channel state information.

If the information related to the initiation of the sensing session does not include information about the number of basic bandwidth allocated to the sensing responders, responders may measure four subcarriers as a unit for two 20 MHz bandwidths (e.g., a specific bandwidth selected among bandwidths ordered in order of good channel environment or high channel quality value) selected among the wide bandwidths and feed back channel state information to the sensing initiator. At this time, information related to starting a sensing session may include instruction information to use two 20 MHz channels.

The sensing initiator may comprehensively determine the channel environment by collecting channel information received from each sensing responder. Channel information may include channel information between sensing responders and an indicator (or designator) indicating the information.

The channels through which the sensing initiator and the sensing responder transmit and receive each other may have similar characteristics based on channel reciprocity. Therefore, the sensing initiator may discard some of the channel information or use it as redundant information based on channel reciprocity.

Additionally, the sensing responder's report (i.e., feedback) may be requested by the sensing initiator after the end of each sensing burst, after the end of each sensing session, or at a specific time.

A report of the sensing receiver may be requested by the STA acting as a transmitter for each sensing burst. If the sensing transmitter is the same for each sensing burst, the request may be omitted.

Alternatively, after the end of each sensing session or at a specific time, the sensing initiator may request a report (e.g., measurement result information) from the STAs that performed the transmitter role in each sensing burst. At this time, the requested measurement result information may include sounding-related transmission information. For example, the sensing initiator may request a report on a specific sounding transmission within a specific burst from the STA acting as a transmitter. To support this, an identifier that can identify (or specify) a specific burst and a specific sounding transmission may be defined. That is, the corresponding identifier may be included in the request frame transmitted from the sensing initiator to the STA serving as the transmitter.

Figure 22:
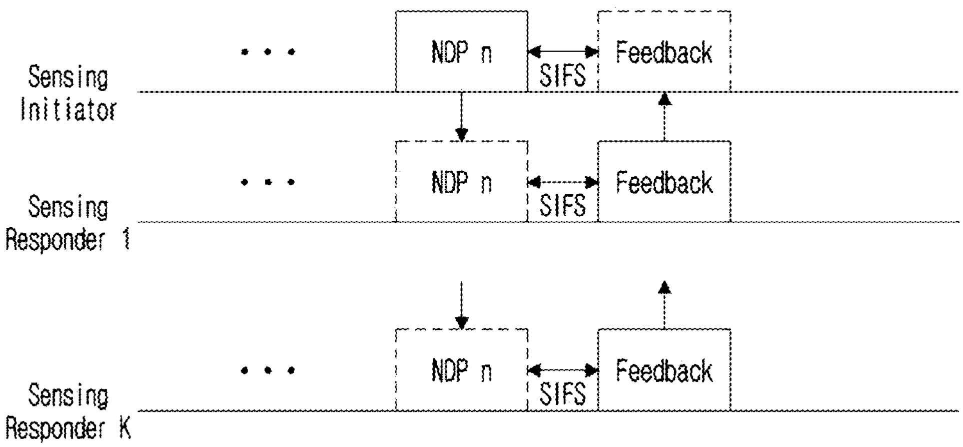
FIG. 22 shows a case where feedback is transmitted from a sensing responder without a trigger frame that can be applied to the present disclosure.

For example, FIG. 22 illustrates a case where feedback is transmitted (reported) from a sensing responder without a trigger frame requesting feedback. The sensing responder may receive the nth NDP (NDP n) from the sensing initiator and transmit a feedback frame to the sensing initiator after SIFS has elapsed. Here, the nth NDP may be the last NDP transmission in the sensing burst. That is, the sensing responder may transmit a feedback frame to the sensing initiator after receiving the last NDP in the sensing burst.

And, if the sensing transmitter is the same for each sensing burst, transmission of the feedback frame may be performed at the end of the sensing session. The reporting phases described above may be performed sequentially.

Figure 23:
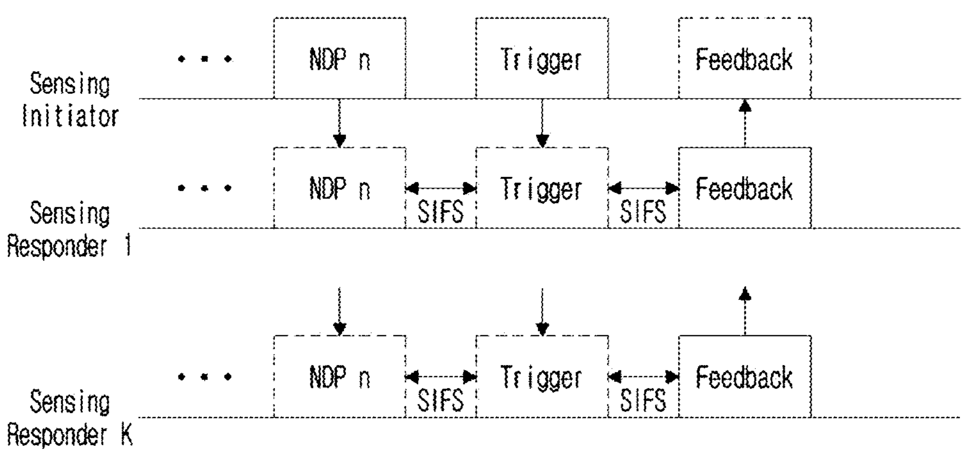
FIG. 23 shows a case where trigger-based feedback is transmitted from a sensing responder that can be applied to the present disclosure.

As another example, FIG. 23 illustrates a case where feedback is transmitted (reported) from a sensing responder based on a trigger frame. The sensing responder may receive the nth NDP (NDP n) from the sensing initiator and receive a trigger frame after SIFS has elapsed. Additionally, the sensing responder may receive the trigger frame and transmit a feedback frame to the sensing initiator after SIFS has elapsed.

Here, the nth NDP may be the last NDP transmission in the sensing burst. That is, the sensing responder may receive the last NDP and trigger frame in the sensing burst, and transmit a feedback frame to the sensing initiator after SIFS has elapsed.

And, if the sensing transmitter is the same for each sensing burst, transmission of the feedback frame may be performed at the end of the sensing session. The reporting phases described above may be performed sequentially.

As another example, the reporting phase (e.g., sounding and feedback phase) may proceed as many times as the number of sensing bursts included in the group information. If the number of bursts is less than the number of STAs in the group, some STAs may not perform the role of a sensing transmitter. For example, assuming channel reciprocity, in the case of a sensing group consisting of K STAs, channel environment information between all STAs may be obtained through transmission of a sensing frame within (K−1) sensing bursts.

Additionally, information about the basic bandwidth allocated to sensing responders for each sensing burst may be different. For example, a specific sensing responder may perform sensing operations for the first and third 20 MHz of the wide bandwidth of 80 MHz in the first sensing burst, and may perform sensing operations for the second and fourth 20 MHz in the second sensing burst.

Sensing Responder-Based Reporting Phase (Phase 3)

The sensing initiator may request and receive a report on channel measurement information from sensing responder STAs that played the role of sensing transmitter for each sensing burst.

In order to receive a report after the end of a sensing session or at a specific time, the sensing initiator may collect channel information acquired when performing a sensing operation through triggering from STAs that played the role of sensing transmitter in each sensing burst. Additionally, the sensing initiator may comprehensively determine the channel environment through the collected channel information.

Channel information provided from each sensing transmitter may include sensing results processed and output from the sensing transmitter and/or information before processing about the channel (e.g., channel status information (CSI)). For example, each sensing transmitter may provide analysis results for human presence.

In order to receive a report at a specific time, the sensing initiator may transmit a frame requesting a report and receive a response frame for the frame. Additionally, reporting operations from STAs that served as sensing transmitters in the sensing burst may proceed simultaneously or sequentially in time.

Figure 24:
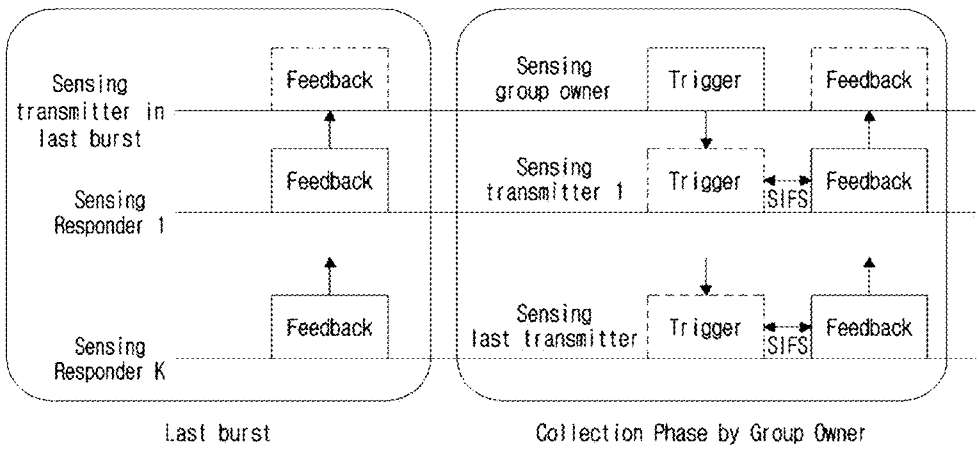
FIG. 24 shows a collection phase by a sensing initiator after a sensing session, to which the present disclosure can be applied.

FIG. 24 is a diagram illustrating a collection phase by a sensing initiator after a sensing session to which the present disclosure may be applied.

The STA that performed the sensing transmitter role in the last burst may receive a feedback frame from the sensing receiver. After the sensing session, the owner (or sensing initiator) of the sensing group may transmit a trigger frame requesting feedback to the STA that performed the sensing transmitter role (e.g., sensing responder STA). Sensing responder STAs may transmit a feedback frame to the sensing group owner based on the trigger frame. Accordingly, the sensing initiator may collect channel state information from sensing responder STAs.

Figure 25:
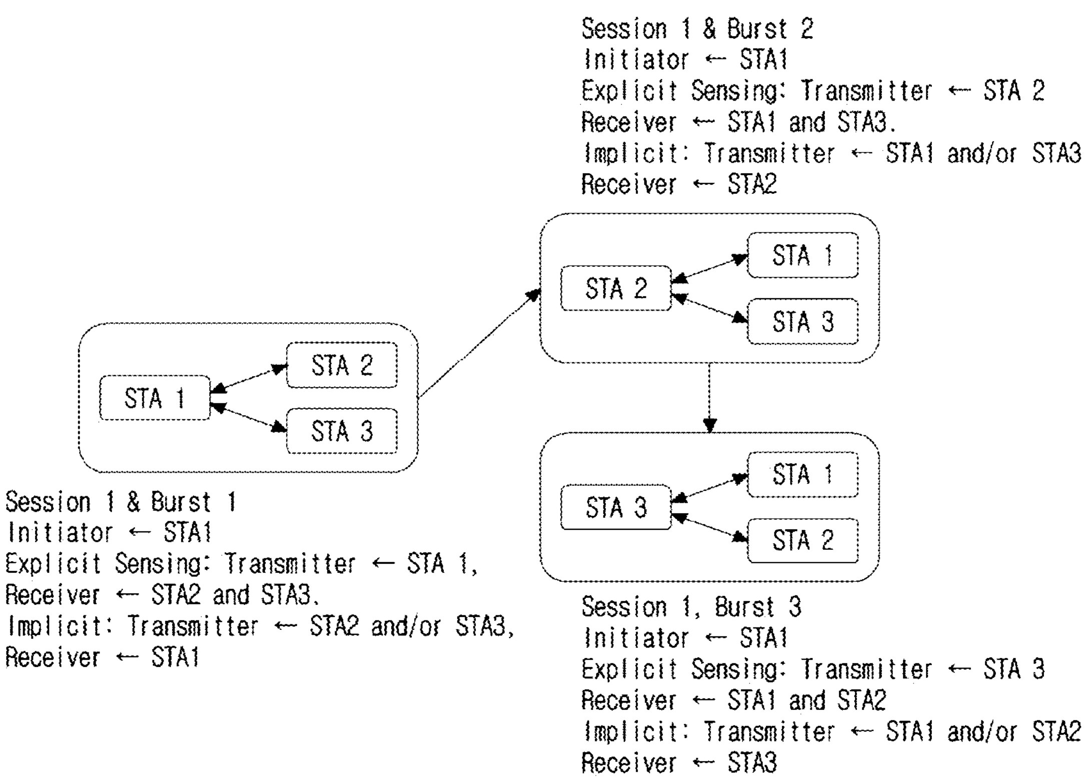
FIG. 25 is a diagram illustrating the order in which STAs in a sensing group perform a sensing procedure, according to an embodiment of the present disclosure.

FIG. 25 is a diagram illustrating the order in which STAs in a sensing group perform a sensing procedure, according to an embodiment of the present disclosure.

STA 1, a sensing group owner that acts as a sensing initiator, may perform explicit sensing operations on STA 2 and STA 3 in sensing burst 1 of sensing session 1. At this time, before STA 1 starts the explicit sensing operation, it may transmit a signal (e.g., polling signal/frame) to STA 2 and STA 3 to check whether the sensing operation may be performed. If STA 2 and/or STA 3 transmit a response indicating that they may perform a sensing operation, STA 1 may perform a sensing operation with STA 2 and/or STA 3.

An explicit sensing operation may consist of an operation in which a sensing transmitter transmits a sensing signal and an operation in which a sensing receiver transmits feedback regarding the same. In the case of an explicit sensing operation, STA 1 may perform the role of a sensing transmitter, and STA 2 and STA 3 may perform the role of a sensing receiver.

In sensing burst 1 of sensing session 1, STA 2 and STA 3 may perform an implicit sensing operation on STA 1. The implicit sensing operation includes an operation of extracting information using sensing signal transmission by the sensing transmitter, and the feedback transmission process may be omitted. In the case of an implicit sensing operation, STA 2 and/or STA 3 may perform the role of a sensing transmitter, and STA 1 may perform the role of a sensing receiver.

In sensing burst 2 following sensing burst 1, the STA performing the sensing transmitter/receiver role in explicit/implicit sensing operations may be changed. Additionally, in sensing burst 3 following sensing burst 2, the STA performing the role of sensing transmitter/receiver in explicit/implicit sensing operations may be changed again. That is, the STA performing the sensing transmitter/receiver role for each sensing burst may be changed. However, this is only an example, and the STA performing the sensing transmitter role in the entire sensing burst may not be changed.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

A method proposed by the present disclosure is mainly described based on an example applied to an IEEE 802.11-based system, 5G system, but may be applied to various WLAN or wireless communication systems other than the IEEE 802.11-based system.

The invention claimed is:

1. A method of performing communication by a first station (STA) in a wireless LAN system, the method comprising:

transmitting, to a plurality of STAs, a first frame to form a group to perform a sensing operation;

transmitting, to at least one STA among the plurality of STAs that transmitted a first response frame for the first frame, a second frame including information related to a sensing session;

performing a first sensing operation with the at least one STA in a first sensing burst of the sensing session; and performing a second sensing operation with the at least one STA in a second sensing burst following the first sensing burst during the sensing session, wherein the first sensing operation includes transmitting a sensing frame from the first STA to the at least one STA, and wherein the second sensing operation includes transmitting the sensing frame from the second STA to the first STA and a remaining STA among the at least one STA.

2. The method of claim 1, wherein:

a third sensing operation is performed in a third sensing burst following the second sensing burst during the sensing session, and the third sensing operation includes one of an operation in which the sensing frame is transmitted to the first STA, or an operation in which the sensing frame is transmitted to the first STA and the second STA.

3. The method of claim 1, wherein:

the first sensing operation is performed based on the third frame, and the third frame includes transmission-related parameters for the first sensing operation.

4. The method of claim 3, wherein:

the third frame includes at least one of a trigger frame or a null data physical layer protocol data unit (PPDU) announcement (NDPA) frame, and the sensing frame includes a null data PPDU (NDP).

5. The method of claim 1, wherein:

a fourth frame requesting a feedback frame for the sensing frame transmitted in the first sensing burst is transmitted to the at least one STA, and based on the fourth frame, the feedback frame is received from the at least one STA.

6. The method of claim 1, wherein:

after the second sensing burst ends, a fifth frame requesting a feedback frame for the sensing frame transmitted in the second sensing burst is transmitted to the second STA.

7. The method of claim 6, wherein:

the fifth frame includes at least one of information related to the sensing frame transmitted in the second sensing burst or information related to the second sensing burst.

8. The method of claim 1, wherein:

the first frame is sequentially transmitted to each of the plurality of STAs, and the first response frame is received from the at least one STA among the plurality of STAs.

9. The method of claim 1, wherein:

the first frame includes resource unit (RU) information allocated to each of the plurality of STAs, and the first response frame is received from the at least one STA based on the RU information.

10. The method of claim 1, wherein:

the at least one STA is an STA that transmitted the first response frame for a preconfigured time after the first frame was transmitted among the plurality of STAs.

11. The method of claim 1, wherein:

capability information related to group sensing operation is received from the plurality of STAs.

12. The method of claim 1, wherein:

the first STA is the owner of the group, and the at least one STA is a member of the group.

13. A first station (STA) performing communication in a wireless LAN system, the first STA comprising:

at least one transceiver; and at least one processor connected to the at least one transceiver, wherein the at least one processor is configured to:

transmit, to a plurality of STAs through the at least one transceiver, a first frame to form a group to perform a sensing operation;

transmit, to at least one STA among the plurality of STAs that transmitted a first response frame for the first frame, a second frame including information related to a sensing session through the at least one transceiver;

perform a first sensing operation with the at least one STA in a first sensing burst of the sensing session; and perform a second sensing operation with the at least one STA in a second sensing burst following the first sensing burst during the sensing session, wherein the first sensing operation includes transmitting a sensing frame from the first STA to the at least one STA, and wherein the second sensing operation includes transmitting the sensing frame from the second STA to the first STA and a remaining STA among the at least one STA.

* * * * *